US011969999B2

(12) United States Patent
Ng et al.

(10) Patent No.: US 11,969,999 B2
(45) Date of Patent: Apr. 30, 2024

(54) FLUID EJECTION DEVICES INCLUDING A MEMORY

(71) Applicant: Hewlett-Packard Development Company, L.P., Spring, TX (US)

(72) Inventors: Boon Bing Ng, Vancouver, WA (US); Mohan Kumar Sudhakar, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/099,517

(22) Filed: Jan. 20, 2023

(65) Prior Publication Data

US 2023/0150258 A1 May 18, 2023

Related U.S. Application Data

(63) Continuation of application No. 16/959,085, filed as application No. PCT/US2019/028407 on Apr. 19, 2019, now Pat. No. 11,590,753.

(51) Int. Cl.
*B41J 29/38* (2006.01)
*B41J 2/045* (2006.01)

(52) U.S. Cl.
CPC ......... *B41J 2/0455* (2013.01); *B41J 2/04541* (2013.01); *B41J 2/04586* (2013.01)

(58) Field of Classification Search
CPC ..... B41J 2/0458; B41J 2/0455; B41J 2/04541
See application file for complete search history.

(56) References Cited

U.S. PATENT DOCUMENTS

| | | | |
|---|---|---|---|
| 6,439,697 B1 | 8/2002 | Axtell et al. | |
| 7,648,227 B2 | 1/2010 | Benjamin et al. | |
| 7,815,273 B2 | 10/2010 | Bruce et al. | |
| 8,128,205 B2 | 3/2012 | Benjamin et al. | |
| 8,864,260 B1 | 10/2014 | Ge et al. | |
| 9,707,752 B2 | 7/2017 | Torgerson et al. | |
| 9,938,136 B2 | 4/2018 | Neo et al. | |
| 9,987,842 B2 | 6/2018 | Luo et al. | |
| 2004/0080554 A1 | 4/2004 | Kim | |
| 2005/0230493 A1 | 10/2005 | Benjamin et al. | |
| 2017/0291414 A1* | 10/2017 | Ge | B41J 2/0458 |

FOREIGN PATENT DOCUMENTS

| | | |
|---|---|---|
| CN | 1779859 A | 5/2006 |
| CN | 1942325 A | 4/2007 |
| CN | 1972804 A | 5/2007 |
| EP | 3758941 A1 | 1/2021 |
| WO | 2019/009904 A1 | 1/2019 |

* cited by examiner

*Primary Examiner* — Lam S Nguyen
(74) *Attorney, Agent, or Firm* — Foley & Lardner LLP

(57) ABSTRACT

An integrated circuit to drive a plurality of fluid actuation devices includes an ID line, a fire line, a discharge path, a memory element, and a latch. The memory element is electrically coupled to the fire line and the discharge path. The latch disables the discharge path in response to a first logic level on the ID line and enables the discharge path in response to a second logic level on the ID line.

16 Claims, 14 Drawing Sheets

FLUID EJECTION DEVICES INCLUDING A MEMORY

CROSS-REFERENCE TO RELATED APPLICATIONS

This application claims the benefit of priority under 35 U.S.C. § 120 as a Continuation of U.S. patent application Ser. No. 16/959,085, filed Jun. 29, 2020, which is a U.S. National Stage Entry under 35 U.S.C. § 371 of International Application No. PCT/US2019/028407, filed Apr. 19, 2019, the contents of all such applications being hereby incorporated by reference in their entirety and for all purposes as if completely and fully set forth herein.

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

Figure 1:
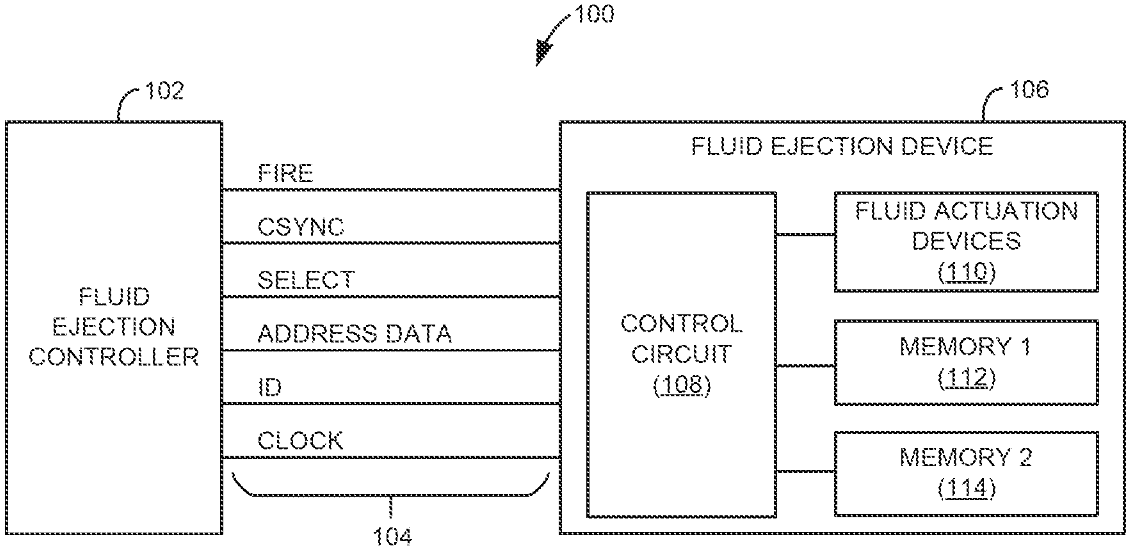
FIG. 1 is a block diagram illustrating one example of a fluid ejection system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

As used herein a "logic high" signal is a logic "1" or "on" signal or a signal having a voltage about equal to the logic power supplied to an integrated circuit (e.g., between about 1.8 V and 15 V, such as 5.6 V). As used herein a "logic low" signal is a logic "0" or "off" signal or a signal having a voltage about equal to a logic power ground return for the logic power supplied to the integrated circuit (e.g., about 0 V).

A printhead for use in a printing system may include nozzles that are activated to cause printing fluid droplets to be ejected from respective nozzles. Each nozzle includes a fluid actuation device. The fluid actuation devices when activated cause a printing fluid droplet to be ejected by the corresponding nozzles. In one example, each fluid actuation device includes a heating element (e.g., a thermal resistor) that when activated generates heat to vaporize a printing fluid in a firing chamber of a nozzle. The vaporization of the printing fluid causes expulsion of a droplet of the printing fluid from the nozzle. In other examples, each fluid actuation device includes a piezoelectric element. When activated, the piezoelectric element applies a force to eject a printing fluid droplet from a nozzle. In other examples, other types of fluid actuation devices may be used to eject a fluid from a nozzle.

A printing system can be a two-dimensional (2D) or three-dimensional (3D) printing system. A 2D printing system dispenses printing fluid, such as ink, to form images on print media, such as paper media or other types of print media. A 3D printing system forms a 3D object by depositing successive layers of build material. Printing fluids dispensed from the 3D printing system may include ink, as well as agents used to fuse powders of a layer of build material, detail a layer of build material (such as by defining edges or shapes of the layer of build material), and so forth.

As used herein, the term "printhead" refers generally to a printhead die or an assembly that includes multiple dies mounted on a support structure. A die (also referred to as an "integrated circuit die") includes a substrate on which is provided various layers to form nozzles and/or control circuitry to control ejection of a fluid by the nozzles.

Although reference is made to a printhead for use in a printing system in some examples, it is noted that techniques or mechanisms of the present disclosure are applicable to other types of fluid ejection devices used in non-printing applications that are able to dispense fluids through nozzles. Examples of such other types of fluid ejection devices include those used in fluid sensing systems, medical systems, vehicles, fluid flow control systems, and so forth.

As devices, including printhead dies or other types of fluid ejection dies, continue to shrink in size, the number of signal lines used to control circuitry of a device may affect the overall size of the device. A large number of signal lines may lead to using a large number of signal pads (referred to as "bond pads") that are used to electrically connect the signal lines to external lines. Adding features to fluid ejection devices may lead to the use of an increased number of signal lines (and corresponding bond pads), which may take up valuable die space. Examples of additional features that may be added to a fluid ejection device include memory devices.

Accordingly, disclosed herein are various example circuits of a fluid ejection device (that includes one die or multiple dies) that may share control and data lines to allow for a reduction in the number of signal lines of the fluid ejection device. As used herein, the term "line" refers to an electrical conductor (or alternatively, multiple electrical conductors) that may be used to carry a signal (or multiple signals).

FIG. 1 is a block diagram illustrating one example of a fluid ejection system 100. Fluid ejection system 100 includes a fluid ejection controller 102 and a fluid ejection device 106. Fluid ejection controller 102 is communicatively coupled to fluid ejection device 106 through a plurality of control lines 104. Fluid ejection device 106 may include a control circuit 108, fluid actuation devices 110, a first memory 112, and a second memory 114. Control circuit 108 is electrically coupled to the fluid actuation devices 110, the first memory 112, and the second memory 114.

Fluid ejection controller 102 is separate from the fluid ejection device 106. Fluid ejection controller 102 may include a processor, an application-specific integrated circuit (ASIC), or other suitable logic circuitry for controlling fluid ejection device 106 through control lines 104. For example, in a printing system, the fluid ejection controller 102 may be a printhead drive controller that is part of the printing system, while the fluid ejection device 106 may be a printhead integrated circuit die that is part of a print cartridge (that includes ink or another agent) or part of another structure.

Fluid actuation devices 110 of fluid ejection device 106 may include an array of nozzles that are selectively controllable to dispense fluid. First memory 112 may include an ID memory used to store identification data and/or other information about the fluid ejection device 106, such as to uniquely identify the fluid ejection device 106. Second memory 114 may include a fire memory used to store data relating to fluid actuation devices 110, where the data may include any or some combination of the following, as examples: die location, region information, drop weight encoding information, authentication information, data to enable or disable selected fluid actuation devices, and so forth.

First memory 112 and second memory 114 may be implemented with different types of memories to form a hybrid memory arrangement. First memory 112 may be implemented with a non-volatile memory, such as an electrically programmable read-only memory (EPROM). Second memory 114 may be implemented with a non-volatile memory, such as a fuse memory, where the fuse memory includes an array of fuses that may be selectively blown (or not blown) to program data into the second memory 114. Although specific examples of types of memories are listed above, it is noted that in other examples, the first memory 112 and the second memory 114 may be implemented with other types of memories. In some examples, the first memory 112 and the second memory 114 may be implemented with the same type of memory.

In one example, fluid actuation devices 110, first memory 112, and second memory 114 of fluid ejection device 106 may be formed on a common die (i.e., a fluid ejection die). In another example, fluid actuation devices 110 may be implemented on one die (i.e., a fluid ejection die), while first memory 112 and second memory 114 may be implemented on a separate die (or respective separate dies). For example, first memory 112 and second memory 114 may be formed on a second die that is separate from the fluid ejection die, or alternatively, first memory 112 and second memory 114 may be formed on respective different dies separate from the fluid ejection die. In other examples, part of first memory 112 may be on one die, and another part of first memory 112 may be on another die. Likewise, part of second memory 114 may be on one die, and another part of second memory 114 may be on another die.

Control circuit 108 controls the operation of fluid actuation devices 110, first memory 112, and second memory 114 based on the control signals received through control lines 104. The control lines 104 include a fire line, a CSYNC line, a select line, an address data line, an ID line, a clock line, and other lines. In other examples, there may be multiple fire lines, and/or multiple select lines, and/or multiple address data lines. Control circuit 108 may select fluid actuation devices 110 or second memory 114 based on an ID signal on the ID line. The ID line may also be used to access first memory 112 for read and/or write operations. Memory elements of the first memory 112 may be addressed based on select and data signals on the select and address data lines.

The fire line is used to control activation of the fluid actuation devices 110 when the fluid actuation devices 110 are selected by the control circuit 108 in response to a first logic level on the ID line. A fire signal on the fire line when set to a first logic level causes a respective fluid actuation device (or fluid actuation devices) to be activated if such fluid actuation device (or fluid actuation devices) are addressed based on select and data signals on the select and address data lines. If the fire signal is set to a second logic level different from the first logic level, then the fluid actuation device (or fluid actuation devices) are not activated. The fire line may also be used to access the second memory 114 for read and/or write operations when the second memory 114 is selected by the control circuit 108 in response to a second logic level on the ID line. Memory elements of the second memory 114 may be addressed based on select and data signals on the select and address data lines.

The CSYNC signal is used to initiate an address (referred to as Ax and Ay) in the fluid ejection device 106. The select line may be used to select certain fluid actuation devices or memory elements. The address data line may be used to carry an address bit (or address bits) to address a specific fluid actuation device or memory element (or a specific group of fluid actuation devices or group of memory elements). The clock line may be used to carry a clock signal for control circuit 108.

In accordance with some implementations of the present disclosure, to enhance flexibility and to reduce the number of input/output (I/O) pads that have to be provided on the fluid ejection device 106, each of the fire line and the ID line performs both primary and secondary tasks. As noted above, the primary task of the fire line is to activate selected fluid actuation device(s) 110. The secondary task of the fire line is to communicate data of the second memory 114. In this manner, a data path may be provided between the fluid ejection controller 102 and the second memory 114 (over the fire line), without having to provide a separate data line between the fluid ejection controller 102 and the fluid ejection device 106.

The primary task of the ID line is to communicate data of the first memory 112. The secondary task of the ID line is to cause the control circuit 108 to enable either the fluid actuation devices 110 or the second memory 114. In this way, a common fire line may be used to control activation of the fluid actuation devices 110 and to communicate data of the second memory 114, where the ID line may be used to select when the fluid actuation devices 110 are controlled by the fire line and when the fire line may be used to communicate data of the second memory 114.

Figure 2:
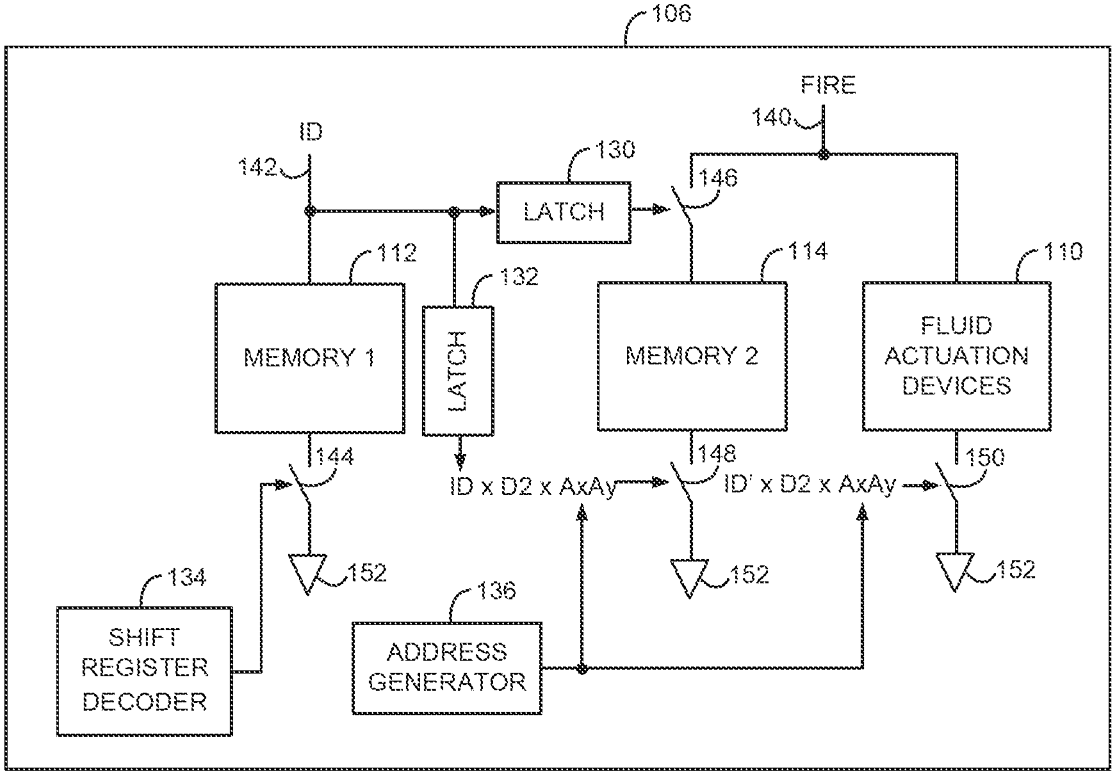
FIG. 2 is a schematic diagram illustrating one example of a fluid ejection device.

FIG. 2 is a schematic diagram illustrating one example of fluid ejection device 106 of FIG. 1 in more detail. Fluid ejection device 106 includes fluid actuation devices 110, first memory 112, second memory 114, latches 130 and 132, a shift register decoder 134, an address generator 136, a fire line 140, an ID line 142, and switches 144, 146, 148, and 150. In one example, fire line 140 and ID line 142 are part of control lines 104 of FIG. 1. Latches 130 and 132, shift register decoder 134, address generator 136, and switches 144, 146, 148, and 150 may be part of control circuit 108 of FIG. 1.

ID line 142 is electrically coupled to an input of latch 130, an input of latch 132, and to first memory 112. Fire line 140 is electrically coupled to one side of switch 146 and to fluid actuation devices 110. The output of latch 130 is electrically coupled to the control input of switch 146. The other side of switch 146 is electrically coupled to second memory 114. The output of latch 132 is electrically coupled to the control input of switch 148. Switch 148 is electrically coupled between second memory 114 and a common or ground node 152. Switch 150 is electrically coupled between fluid actuation devices 110 and a common or ground node 152. An output of address generator 136 is electrically coupled to the control input of switch 148 and the control input of switch 150. An output of shift register 134 is electrically coupled to the control input of switch 144. Switch 144 is electrically coupled between first memory 112 and a common or ground node 152.

First memory 112 may include a plurality of memory elements. Switch 144 may include a plurality of switches, where each switch corresponds to one of the memory elements of first memory 112. Shift register decoder 134 selects a memory element of first memory 112 for read and/or write access by closing the switch 144 corresponding to the selected memory element. Shift register decoder 134 disables memory elements of first memory 112 by opening the switches 144 corresponding to the disabled memory elements. With a memory element of first memory 112 selected by shift register decoder 134, the memory element may be accessed for read and/or write operations through ID line 142.

Latch 130 receives the ID signal on ID line 142, latches the logic level of the ID signal, and controls switch 146 based on the latched value. In response to a first logic level (e.g., a logic high) of the latched value, latch 130 turns on switch 146. In response to a second logic level (e.g., a logic low) of the latched value, latch 130 turns off switch 146. With switch 146 closed, second memory 114 is enabled for read and/or write access through fire line 140. With switch 146 open, second memory 114 is disabled.

Second memory 114 may include a plurality of memory elements. Switch 148 may include a plurality of switches, where each switch corresponds to one of the memory elements of second memory 114. Switch 150 may include a plurality of switches, where each switch corresponds to one of the fluid actuation devices 110. Latch 132 receives the ID signal on ID line 142, latches the inverted logic level of the ID signal, and controls switch 148 based on the latched value. In response to a first logic level (e.g., a logic high) of the latched value, latch 132 disables switch 148 (i.e., prevents switch 148 from being turned on). In response to second logic level (e.g., a logic low) of the latched value, latch 132 enables switch 148 (i.e., allows switch 148 to be turned on).

Address generator 136 generates address signals Ax and Ay for selecting a memory element of second memory 114 or a fluid actuation device 110. The selection of a memory element of second memory 114 or a fluid actuation device 110 may also be based on a data signal (D2) on an address data line. Accordingly, as shown in FIG. 2 and described in more detail below, switch 148 may be controlled based on ID×D2×AxAy and switch 150 may be controlled based on ID'×D2×AxAy. With switch 150 open, switch 146 closed, and switch 148 closed, second memory 114 may be accessed for read and/or write operations through fire line 140. With switch 146 open, switch 148 open, and switch 150 closed, fluid actuation devices 110 may be activated through fire line 140.

Figure 3:
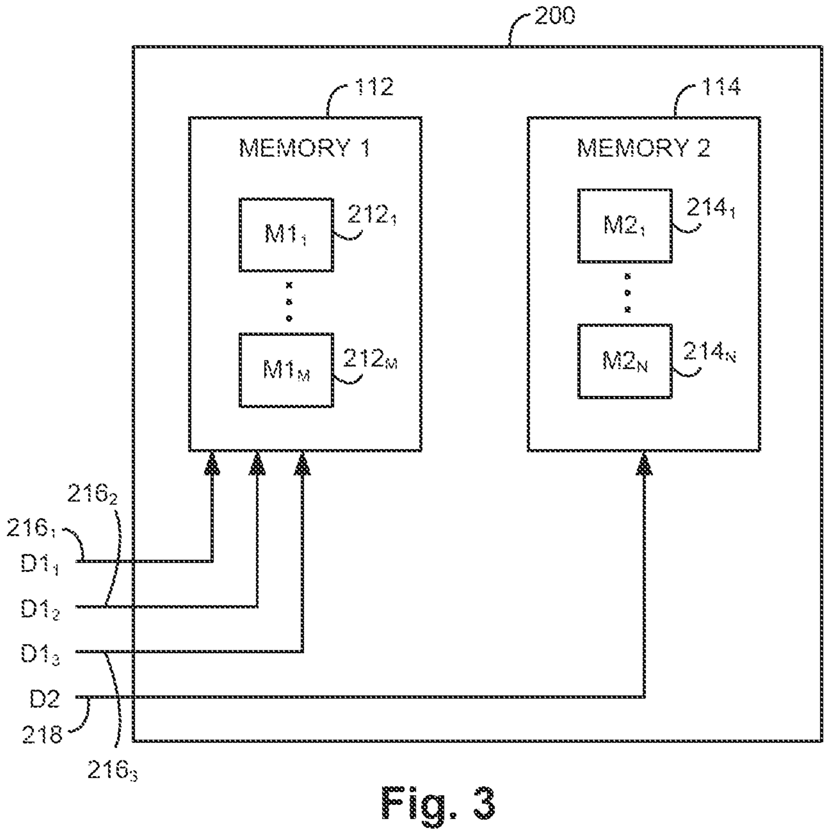
FIG. 3 is a block diagram illustrating one example of a circuit including a first memory and a second memory of a fluid ejection device.

FIG. 3 is a block diagram illustrating one example of a circuit 200 including a first memory and a second memory of a fluid ejection device. In one example, circuit 200 is part of an integrated circuit to drive a plurality of fluid actuation devices. Circuit 200 includes a first memory 112 and a second memory 114. First memory 112 includes a plurality of first memory elements $212_1$ to $212_M$, where "M" is any suitable number of memory elements. Second memory 114 includes a plurality of second memory elements $214_1$ to $214_N$, where "N" is any suitable number of memory elements. First memory 112 and second memory 114 may include the same number of memory elements or different numbers of memory elements.

Circuit 200 also includes a plurality of first data ($D1_1$ to $D1_3$) lines $216_1$ to $216_3$ and a second data (D2) line 218. The first data lines $216_1$ to $216_3$ are electrically coupled to first memory 112, and the second data line 218 is electrically coupled to second memory 114. In one example, first data lines $216_1$ to $216_3$ and second data line 218 are part of the address data lines of control lines 104 of FIG. 1. In this example, a memory element 212 of first memory 112 is enabled in response to first data on the plurality of first data lines $216_1$ to $216_3$, and a memory element 214 of second memory 114 is enabled in response to second data on the second data line 218.

Figure 4:
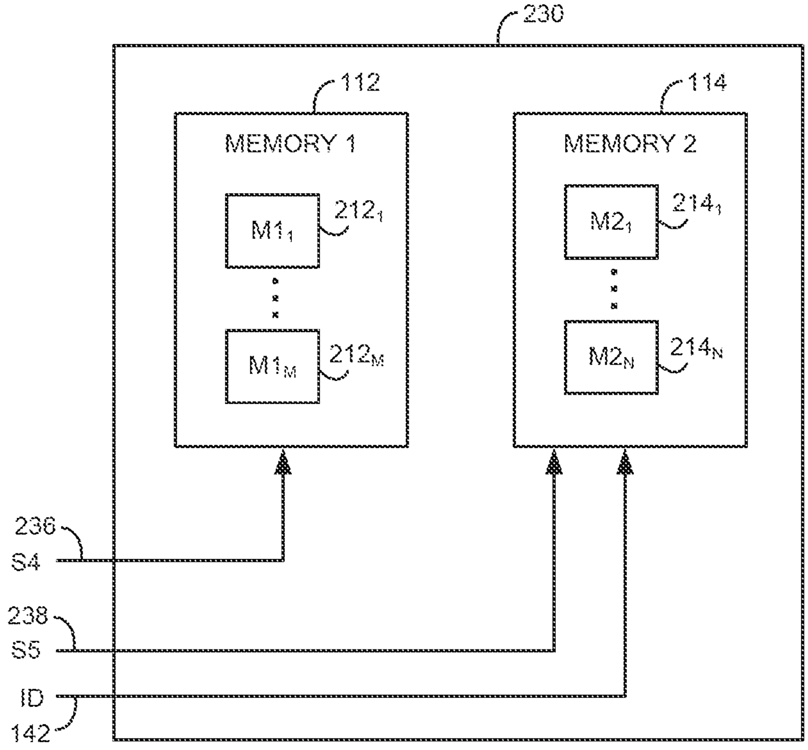
FIG. 4 is a block diagram illustrating another example of a circuit including a first memory and a second memory of a fluid ejection device.

FIG. 4 is a block diagram illustrating another example of a circuit 230 including a first memory and a second memory of a fluid ejection device. In one example, circuit 230 is part of an integrated circuit to drive a plurality of fluid actuation devices. Circuit 230 includes first memory 112 and second memory 114 as previously described and illustrated with reference to FIG. 3. Circuit 230 also includes an ID line 142, a first select (S4) line 236, and a second select (S5) line 238.

The first select line 236 is electrically coupled to first memory 112, and the second select line 238 and the ID line 142 are electrically coupled to the second memory 114. In this example, a memory element 212 of first memory 112 is enabled in response to a first logic level on the first select line 236, and a memory element 214 of second memory 114 is enabled in response to a first logic level on the second select line 238 and a first logic level on the ID line.

In one example, circuit 200 of FIG. 3 may be combined with circuit 230 of FIG. 4. Therefore, first memory 112 may be accessed based on an address generated by the first data $D1_1$, $D1_2$, and $D1_3$ (e.g., via a shift register decoder 134 of FIG. 1), while second memory 114 may be accessed based on an address generated by second data D2. The first data and the second data may be fully independent from each other. In addition, first memory 112 may be enabled in response to the S4 select signal, while second memory 114 may be enabled in response to the S5 select signal. The S4 select signal and the S5 select signal may be staggered. In this way, corruption on the ID signal due to a shift register (e.g., shift register decoder 134 of FIG. 1) may be avoided.

Figure 5:
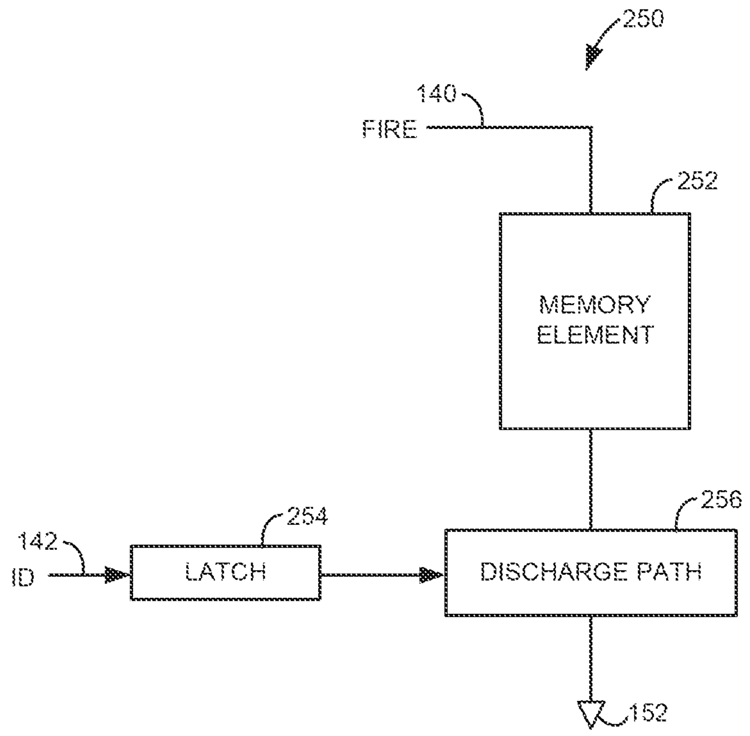
FIG. 5 is a schematic diagram illustrating one example of a circuit including a memory element of a fluid ejection device.

FIG. 5 is a schematic diagram illustrating one example of a circuit 250 including a memory element of a fluid ejection device. In one example, circuit 250 is part of an integrated circuit to drive a plurality of fluid actuation devices. Circuit 250 includes a fire line 140, an ID line 142, a memory element 252, a latch 254, and a discharge path 256. Fire line 140 is electrically coupled to memory element 252. ID line 142 is electrically coupled to an input of latch 254. An output of latch 254 is electrically coupled to an input of discharge path 256. Discharge path 256 is electrically coupled between memory element 252 and a common or ground node 152.

Discharge path 256 keeps memory element 252 from floating when memory element 252 is not enabled for read and/or write access. In this example, latch 254 disables the discharge path in response to a first logic level (e.g., a logic high) on the ID line 142 and enables the discharge path in response to a second logic level (e.g., a logic low) on the ID line. When memory element 252 is enabled, discharge path 256 is disabled and memory element 252 may be accessed through fire line 140 for read and/or write operations. In one example, latch 254 provides latch 132 of FIG. 2, discharge path 256 is part of the control input to switch 148, and memory element 252 is a memory element of second memory 114 of FIG. 2.

Figure 6:
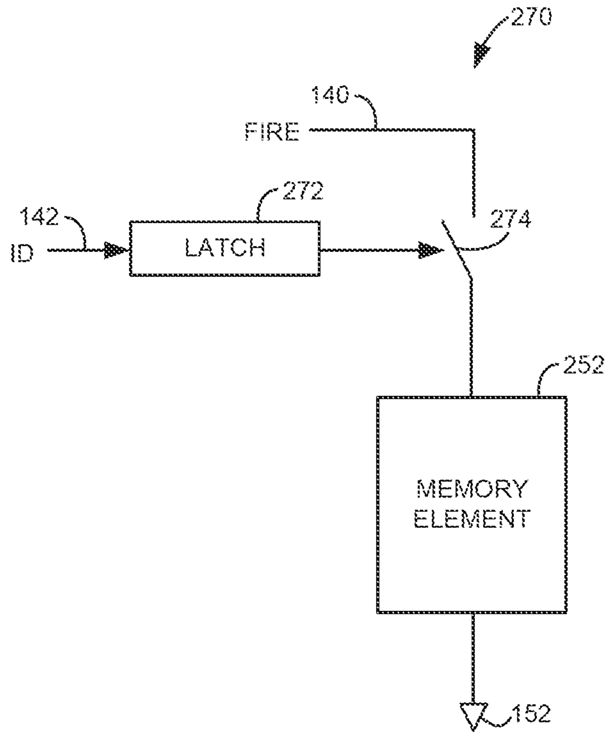
FIG. 6 is a schematic diagram illustrating another example of a circuit including a memory element of a fluid ejection device.

FIG. 6 is a schematic diagram illustrating another example of a circuit 270 including a memory element of a fluid ejection device. In one example, circuit 270 is part of an integrated circuit to drive a plurality of fluid actuation devices. Circuit 270 includes a fire line 140, an ID line 142, a memory element 252, a latch 272, and a switch 274. Switch 274 is electrically coupled between fire line 140 and memory element 252. The input of latch 272 is electrically coupled to the ID line 142. The output of latch 272 is electrically coupled to the control input of switch 274. Memory element 252 is electrically coupled to a common or ground node 152.

In this example, latch 272 enables (i.e., turns on) switch 274 in response to a first logic level (e.g., a logic high) on the ID line 142 and disables (i.e., turns off) switch 274 in response to a second logic level (e.g., a logic low) on the ID line. With switch 274 enabled, the fire line 140 is electrically connected to memory element 252. With switch 274 disabled, fire line 140 is electrically disconnected from memory element 252. With switch 274 enabled, memory element 252 may be accessed through fire line 140 for read and/or write operations. In one example, latch 272 provides latch 130 of FIG. 2, switch 274 provides switch 146 of FIG. 2, and memory element 252 is a memory element of second memory 114 of FIG. 2.

Figure 7A:
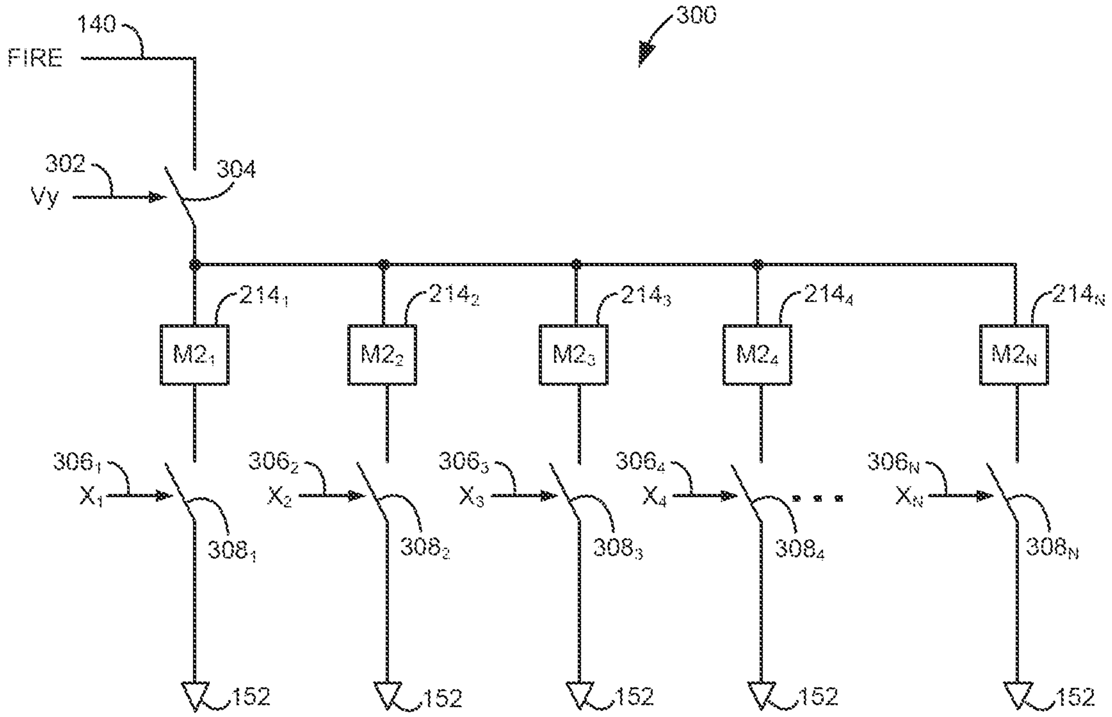
FIG. 7A is a schematic diagram illustrating one example of a circuit including a plurality of memory elements of a fluid ejection device.

FIG. 7A is a schematic diagram illustrating one example of a circuit 300 including a plurality of memory elements of a fluid ejection device. In one example, circuit 300 is part of an integrated circuit to drive a plurality of fluid actuation devices. Circuit 300 includes a fire line 140, a plurality of memory elements $214_1$ to $214_N$, a first switch 304, and a plurality of second switches $308_1$ to $308_N$. Switch 304 is electrically coupled between the fire line 140 and a first side of each memory element $214_1$ to $214_N$. The control input of switch 304 is electrically coupled to a control (Vy) signal line 302. One side of each second switch $308_1$ to $308_N$ is electrically coupled to a second side of a respective memory element $214_1$ to $214_N$. The other side of each second switch $308_1$ to $308_N$ is electrically coupled to a common or ground node 152. The control input of each second switch $308_1$ to $308_N$ is electrically coupled to a control ($X_1$ to $X_N$) signal line $306_1$ to $306_N$, respectively.

The Vy control signal may be based on the ID signal (e.g., on ID line 142). Control signals $X_1$ to $X_N$ may be based on the ID signal (e.g., on ID line 142), the D2 data signal (e.g., on D2 data line 218), and the Ax and Ay address signals (e.g., from address generator 136). In this example, a memory element $214_1$ to $214_N$ may be enabled by turning on switch 304 in response to the Vy signal and turning on at least one respective second switch $308_1$ to $308_N$ in response to a respective $X_1$ to $X_N$ signal. With a memory element $214_1$ to $214_N$ enabled, the enabled memory element may be accessed for read and/or write operations through fire line 140. In one example, first switch 304 provides switch 146 of FIG. 2, and each second switch $308_1$ to $308_N$ provides a switch 148 of FIG. 2.

Figure 7B:
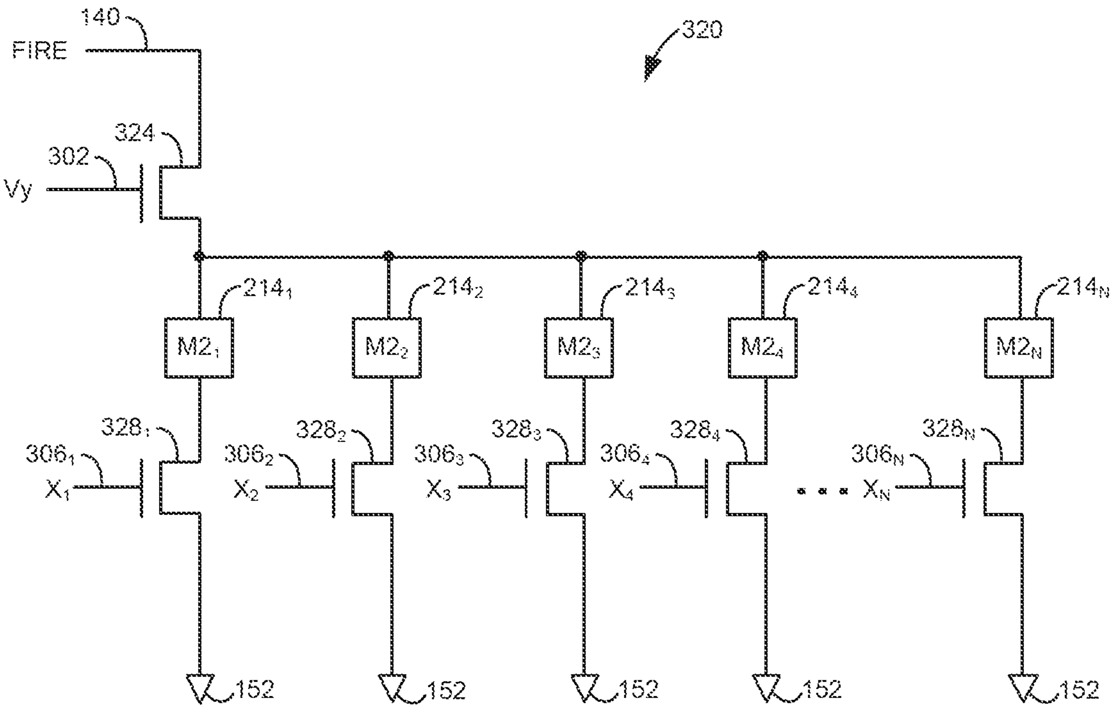
FIG. 7B is a schematic diagram illustrating another example of a circuit including a plurality of memory elements of a fluid ejection device.

FIG. 7B is a schematic diagram illustrating another example of a circuit 320 including a plurality of memory elements of a fluid ejection device. In one example, circuit 320 is part of an integrated circuit to drive a plurality of fluid actuation devices. Circuit 320 is similar to circuit 300 previously described and illustrated with reference to FIG. 7A, except that in circuit 320 a first transistor 324 is used in place of first switch 304 and a plurality of second transistors $328_1$ to $328_N$ are used in place of second switches $308_1$ to $308_N$. First transistor 324 has a source-drain path electrically coupled between the fire line 140 and a first side of each memory element $214_1$ to $214_N$. Each second transistor $328_1$ to $328_N$ has a source-drain path electrically coupled between a respective memory element $214_1$ to $214_N$ and a common or ground node 152. The gate of each second transistor $328_1$ to $328_N$ is electrically coupled to a control signal line $306_1$ to $306_N$, respectively.

In this example, a memory element $214_1$ to $214_N$ may be enabled by turning on first transistor 324 in response to a logic high Vy signal and turning on at least one respective second transistor $328_1$ to $328_N$ in response to a respective logic high $X_1$ to $X_N$ signal. With a memory element $214_1$ to $214_N$ enabled, the enabled memory element may be accessed for read and/or write operations through fire line 140. In one example, first transistor 324 provides switch 146 of FIG. 2, and each second transistor $328_1$ to $328_N$ provides a switch 148 of FIG. 2.

Figure 8A:
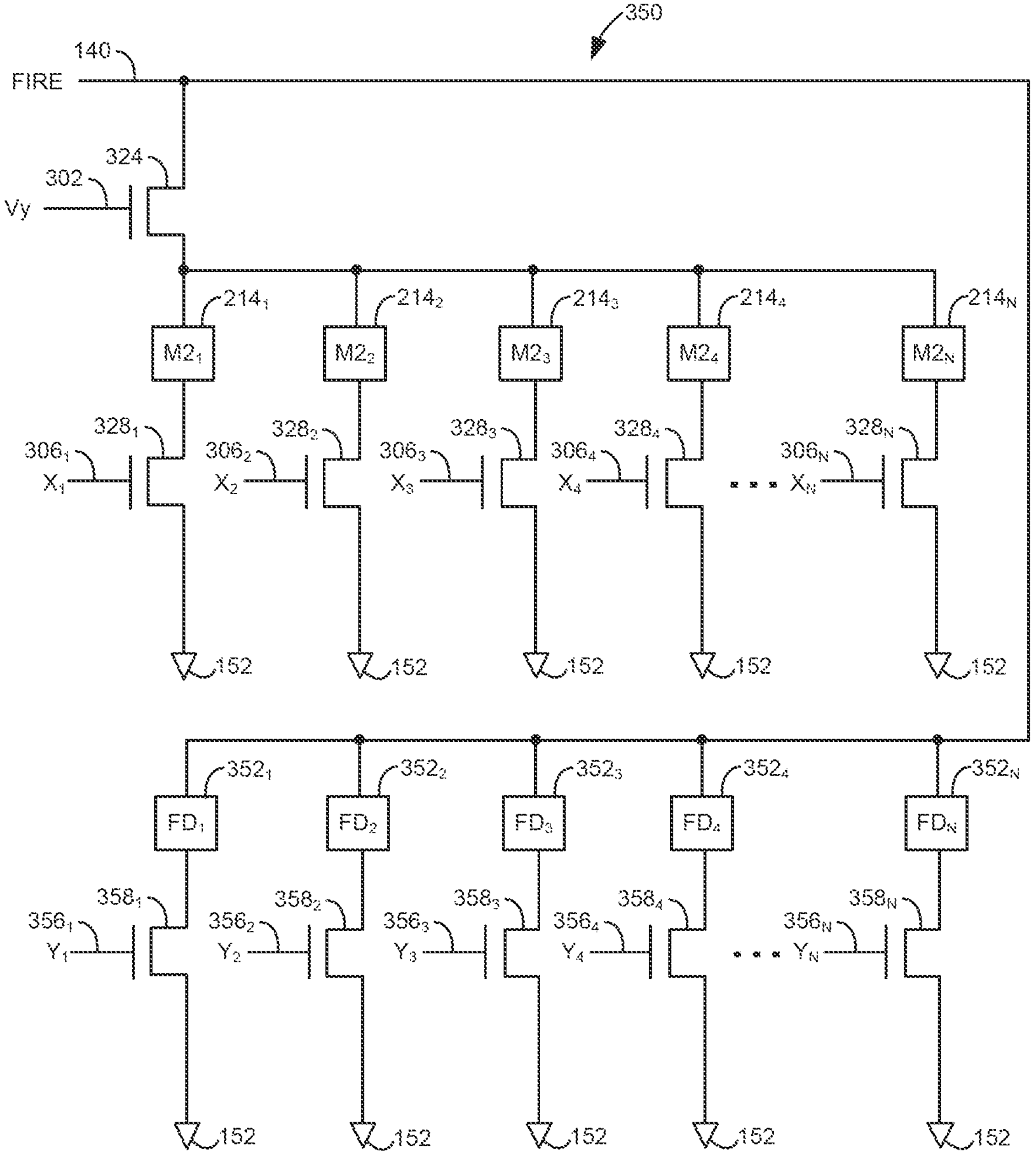
FIGS. 8A-8B are schematic diagrams illustrating one example of a circuit including a plurality of memory elements and a plurality of fluid actuation devices of a fluid ejection device.
Figure 8B:
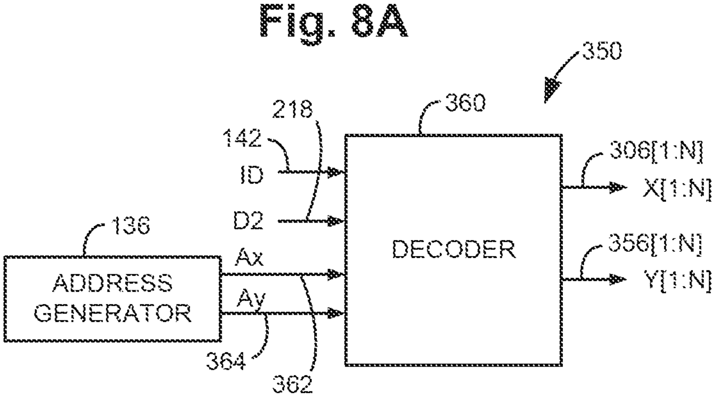

FIGS. 8A-8B are schematic diagrams illustrating one example of a circuit 350 including a plurality of memory elements and a plurality of fluid actuation devices of a fluid ejection device. In one example, circuit 350 is part of an integrated circuit to drive a plurality of fluid actuation devices. Circuit 350 includes circuit 320 previously described and illustrated with reference to FIG. 7B. In addition, as illustrated in FIG. 8A, circuit 350 includes a plurality of fluid actuation devices 352$_1$ to 352$_N$ and a plurality of third switches (e.g., third transistors) 358$_1$ to 358$_N$. Each fluid actuation device 352$_1$ to 352$_N$ is electrically coupled between the fire line 140 and one side of the source-drain path of a respective third transistor 358$_1$ to 358$_N$. The other side of the source-drain path of each third transistor 358$_1$ to 358$_N$ is electrically coupled to a common or ground node 152. The gate of each third transistor 358$_1$ to 358$_N$ is electrically coupled to a control ($Y_1$ to $Y_N$) signal line 356$_1$ to 356$_N$, respectively.

As illustrated in FIG. 8B, circuit 350 also includes an address generator 136 and a decoder 360. Outputs of address generator 136 are electrically coupled to inputs of decoder 360 through an Ax address signal line 362 and an Ay address signal line 364. Other inputs to decoder 360 are electrically coupled to ID line 142 and second data line 218. First outputs of decoder 360 are electrically coupled to the gates of second transistors 328$_1$ to 328$_N$ through control signal lines 306$_1$ to 306$_N$, respectively. Second outputs of decoder 360 are electrically coupled to the gates of third transistors 358$_1$ to 358$_N$ through control signal lines 356$_1$ to 356$_N$, respectively.

Ax and Ay are output by address generator 136, such as in response to a select signal on the select line and a CSYNC signal on the CSYNC line. In one example, decoder 360 receives an address (e.g., D2, Ax, Ay) to turn on a respective second transistor 328$_1$ to 328$_N$ or a respective third transistor 358$_1$ to 358$_N$ in response to the address. In another example, in response to a first logic level (e.g., a logic high) on the ID line 142, decoder 360 turns on a respective second transistor 328$_1$ to 328$_N$ in response to the address, and in response to a second logic level (e.g., a logic low) on the ID line 142, decoder 360 turns on a respective third transistor 358$_1$ to 358$_N$ in response to the address to enable a respective fluid actuation device 352$_1$ to 352$_N$. With a fluid actuation device 352$_1$ to 352$_N$ enabled, the enabled fluid actuation device may be activated through fire line 140. In one example, each third transistor 358$_1$ to 358$_N$ provides a switch 150 of FIG. 2.

Figure 9A:
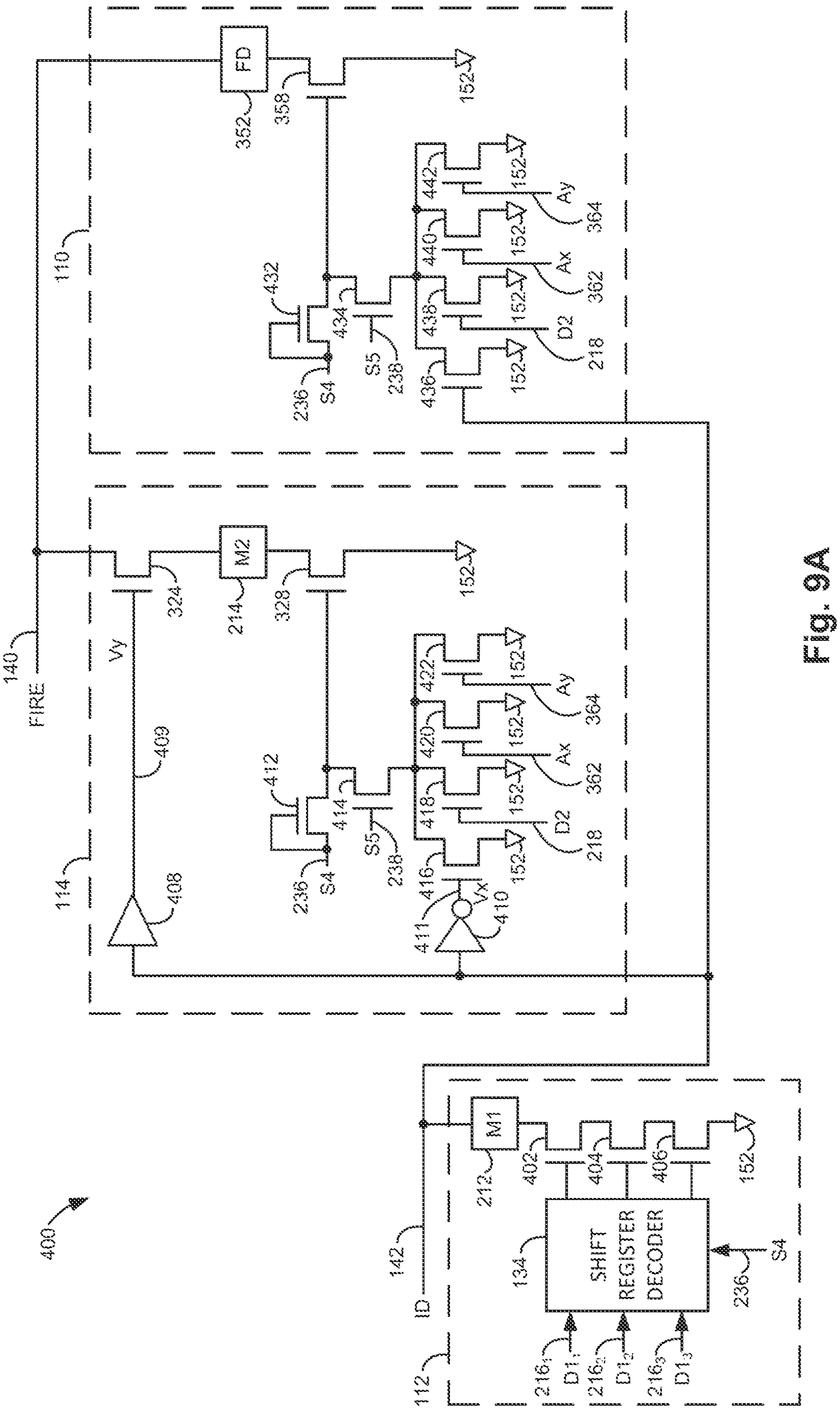
FIG. 9A is a schematic diagram illustrating one example of a circuit including a first memory, a second memory, and fluid actuation devices.

FIG. 9A is a schematic diagram illustrating one example of a circuit 400 including a first memory 112, a second memory 114, and fluid actuation devices 110 in more detail. In one example, circuit 400 is part of an integrated circuit to drive a plurality of fluid actuation devices. While first memory 112 includes a plurality of memory elements, just one memory element 212 is shown in FIG. 9A. Likewise, while second memory 114 includes a plurality of memory elements, just one memory element 214 is shown in FIG. 9A, and while fluid actuation devices 110 include a plurality of fluid actuation devices, just one fluid actuation device 352 is shown in FIG. 9A.

Circuit 400 includes a fire line 140, an ID line 142, first data lines 216$_1$ to 216$_3$, a second data line 218, select lines 236 and 238, an Ax address signal line 362, an Ay address signal line 364, a shift register decoder 134, and transistors 324, 328, and 358 as previously described. In addition, circuit 400 includes a buffer 408, an inverter 410, and transistors 402, 404, 406, 412, 414, 416, 418, 420, 422, 432, 434, 436, 438, 440, and 442. In one example, transistors 402, 404, and 406 may provide a switch 144 of FIG. 2. Buffer 408 may provide latch 130 of FIG. 2 or latch 272 of FIG. 6. Inverter 410 may provide latch 132 of FIG. 2 or latch 254 of FIG. 5. Transistor 416 may provide part of discharge path 256 of FIG. 5 for first memory 114. Transistor 436 may provide a discharge path for fluid actuation devices 110. Transistors 412, 414, 418, 420, 422, 432, 434, 438, 440, and 442 may provide part of decoder 360 of FIG. 8B.

First inputs of shift register decoder 134 are electrically coupled to first data lines 216$_1$ to 216$_3$. A second input of shift register decoder 134 is electrically coupled to first select (S4) line 236. Outputs of shift register decoder 134 are electrically coupled to the gates of transistors 402, 404, and 406. Transistors 402, 404, and 406 are electrically coupled in series between memory element 212 and a common or ground node 152. When the transistors 402, 404, and 406 are turned on, memory element 212 is addressed, such that data of memory element 212 may be accessed via the ID line 142.

Shift register decoder 134 includes shift registers connected to each of the first data lines 216$_1$ to 216$_3$ to input address data bits to the shift register decoder 134. Each shift register includes a series of shift register cells, which may be implemented as flip-flops, other storage elements, or any sample and hold circuits (such as circuits to pre-charge and evaluate address data bits) that can hold their values until the next selection of the storage elements. The output of one shift register cell in the series can be provided to the input of the next shift register cell to perform data shifting through the shift register. The address data bits provided through each shift register is connected to the gate of a respective one of the transistors 402, 404, and 406.

By using shift registers in the shift register decoder 134, a small number of data lines 216$_1$ to 216$_3$ may be used to select a larger address space. For example, each shift register may include eight (or any other number of) shift register cells. With three address data bits ($D1_1$, $D1_2$, and $D1_3$) input to the shift register decoder 134 that includes three shift registers, each of length eight, then the address space that may be addressed by the shift register decoder 134 is 512 bits (instead of just eight bits if the three address bits are used without using the shift registers of the shift register decoder 134). The output of shift register decoder 134 may be enabled in response to a first logic level on the first select (S4) line 236 and disabled in response to a second logic level on the first select (S4) line 236.

Buffer 408 is electrically coupled between the ID line 142 and the gate of transistor 324 through a Vy node 409. Inverter 410 is electrically coupled between the ID line 142 and the gate of transistor 416 through a Vx node 411. One side of the source-drain path of transistor 416 is electrically coupled to a common or ground node 152. The other side of the source-drain path of transistor 416 is electrically coupled to one side of the source-drain path of transistor 414, one side of the source-drain path of transistor 418, one side of the source-drain path of transistor 420, and one side of the source-drain path of transistor 422. The other side of the source-drain path of each transistor 418, 420, and 422 is electrically coupled to a common or ground node 152. The gate of transistor 418 is electrically coupled to the second data line 218. The gate of transistor 420 is electrically coupled to the Ax address signal line 362. The gate of transistor 422 is electrically coupled to the Ay address signal line 364. The gate of transistor 414 is electrically coupled to the second select (S5) line 238. The other side of the source-drain path of transistor 414 is electrically coupled to one side of the source-drain path of transistor 412 and the gate of transistor 328. The other side of the source-drain path and the gate of transistor 412 are electrically coupled to the first select (S4) line 236.

The gate of transistor 436 is electrically coupled to the ID line 142. One side of the source-drain path of transistor 436 is electrically coupled to a common or ground node 152. The other side of the source-drain path of transistor 436 is electrically coupled to one side of the source-drain path of transistor 434, one side of the source-drain path of transistor 438, one side of the source-drain path of transistor 440, and one side of the source-drain path of transistor 442. The other side of the source-drain path of each transistor 438, 440, and 442 is electrically coupled to a common or ground node 152. The gate of transistor 438 is electrically coupled to the second data line 218. The gate of transistor 440 is electrically coupled to the Ax address signal line 362. The gate of transistor 442 is electrically coupled to Ay address signal line 364. The gate of transistor 434 is electrically coupled to the second select (S5) line 238. The other side of the source-drain path of transistor 434 is electrically coupled to one side of the source-drain path of transistor 432 and the gate of transistor 358. The other side of the source-drain path and the gate of transistor 432 are electrically coupled to the first select (S4) line 236.

Two separate decoders are used to control the respective transistors 328 and 358 that are connected to the memory element 214 and the fluid activation device 352, respectively. The gate of transistor 328 is connected to a first decoder that includes transistors 412, 414, 418, 420, and 422. The gate of transistor 358 is connected to a second decoder that includes transistors 432, 434, 438, 440, and 442. The S4 select signal may be activated earlier in time than the S5 select signal. The combination of Ax, Ay, D2, S4, and S5 form the address input to the first decoder and the second decoder.

When the ID signal on ID line 142 is at a first logic level (e.g., logic high), transistor 436 turns on and causes the gate of transistor 358 to remain discharged (i.e., disables the gate of transistor 358), such that the fluid activation device 352 is maintained deactivated. In addition, when the ID signal is at the first logic level (e.g., logic high), transistor 324 is turned on by buffer 408 and transistor 416 is turned off by inverter 410, such that when transistor 328 is turned on based on an address input to the first decoder, memory element 214 may be accessed for read and/or write operations through fire line 140.

When the ID signal on ID line 142 is at a second logic level (e.g., a logic low), transistor 436 turns off, such that when transistor 358 is turned on based on an address input to the second decoder, fluid actuation device 352 may be activated through fire line 140. In addition, when the ID signal is at the second logic level (e.g., logic low), transistor 324 is turned off by buffer 408 and transistor 416 is turned on by inverter 410. With transistor 416 turned on, the gate of transistor 328 remains discharged (i.e., the gate of transistor 328 is disabled), such that memory element 214 is maintained deselected.

Figure 9B:
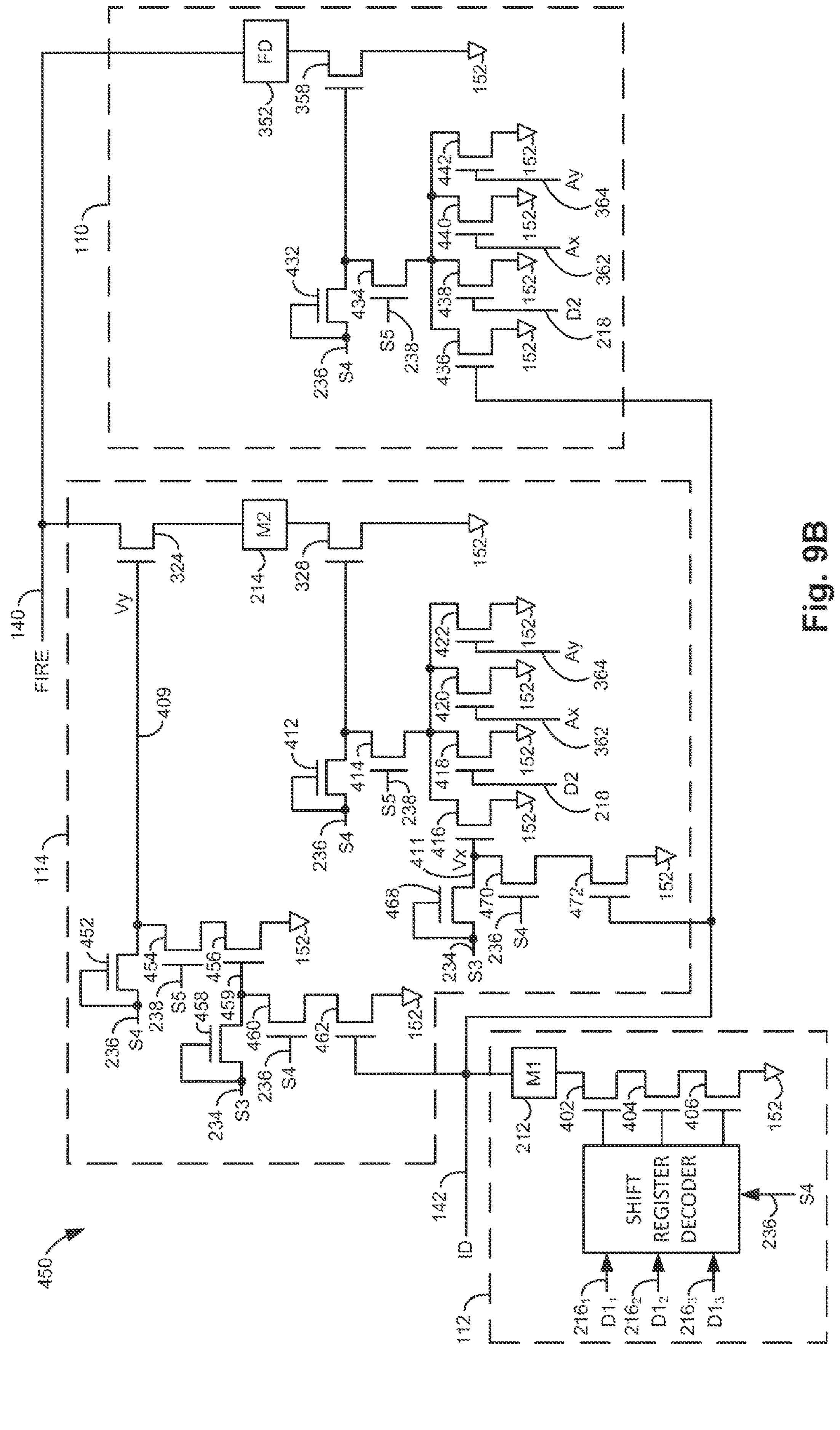
FIG. 9B is a schematic diagram illustrating another example of a circuit including a first memory, a second memory, and fluid actuation devices.

FIG. 9B is a schematic diagram illustrating another example of a circuit 450 including a first memory 112, a second memory 114, and fluid actuation devices 110. In one example, circuit 450 is part of an integrated circuit to drive a plurality of fluid actuation devices. Circuit 450 is similar to circuit 400 previously described and illustrated with reference to FIG. 9A, except that in circuit 450, transistors 452, 454, 456, 458, 460, and 462 are used in place of buffer 408; and transistors 468, 470, and 472 are used in place of inverter 410.

Transistor 460 and transistor 462 are electrically coupled in series between a node 459 and a common or ground node 152. The gate of transistor 462 is electrically coupled to the ID line 142, and the gate of transistor 460 is electrically coupled to the S4 select line 236. Transistor 458 has a source-drain path electrically coupled between the S3 select line 234 and the node 459. The gate of transistor 458 is electrically coupled to the S3 select line 234. Transistor 454 and transistor 456 are electrically coupled in series between the gate of transistor 324 and a common or ground node 152. The gate of transistor 456 is electrically coupled to the node 459. The gate of the transistor 454 is electrically coupled to the S5 select line 238. Transistor 452 has a source-drain path electrically coupled between the S4 select line 236 and the gate of transistor 324. The gate of transistor 452 is electrically coupled to the S4 select line 236.

Transistor 470 and transistor 472 are electrically coupled in series between the gate of transistor 416 and a common or ground node 152. The gate of transistor 472 is electrically coupled to the ID line 142. The gate of transistor 470 is electrically coupled to the S4 select line 236. Transistor 468 has a source-drain path electrically coupled between the S3 select line 234 and the gate of transistor 416. The gate of transistor 468 is electrically coupled to the S3 select line 234.

The S3 select signal may be activated earlier in time than the S4 select signal. The S4 select signal may be activated earlier in time than the S5 select signal. With the ID signal on ID line 142 at a first logic level (e.g., a logic high), a second logic level (e.g., a logic low) is latched on Vx node 411 in response to the S3 and S4 select signals. With the ID signal at a second logic level (e.g., a logic low), a first logic level (e.g., a logic high) is latched on Vx node 411 in response to the S3 and S4 select signals.

With the ID signal on ID line 142 at a first logic level (e.g., a logic high), a second logic level (e.g., a logic low) is latched on node 459 in response to the S3 and S4 select signals. With the ID signal at a second logic level (e.g., a logic low), a first logic level (e.g., a logic high) is latched on node 459 in response to the S3 and S4 select signals. With a first logic level (e.g., a logic high) on node 459, a second logic level (e.g., a logic low) is latched on Vy node 409 in response to the S4 and S5 select signals. With a second logic level (e.g., a logic low) on node 459, a first logic level (e.g., a logic high) is latched on Vy node 409 in response to the S4 and S5 select signals. Accordingly, with the ID signal on ID line 142 at a first logic level (e.g., a logic high), a first logic level (e.g., a logic high) is latched on Vy node 409 in response to the S3, S4, and S5 select signals. With the ID signal at a second logic level (e.g., a logic low), a second logic level (e.g., a logic low) is latched on Vy node 409 in response to the S3, S4, and S5 select signals.

Figure 10A:
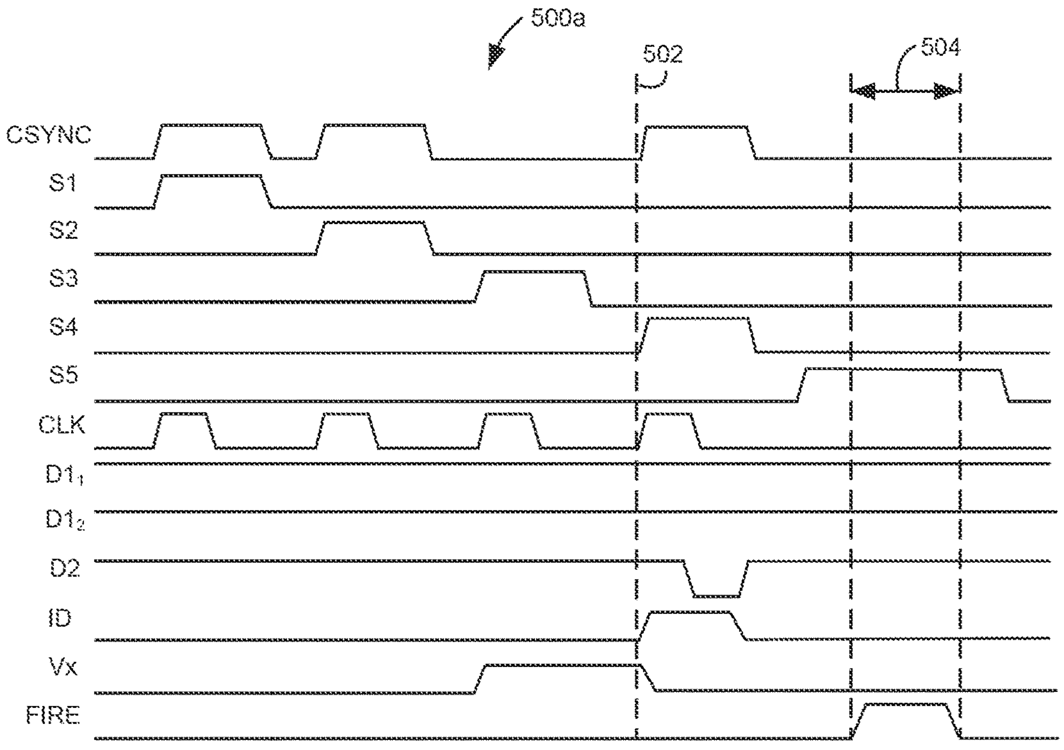
FIGS. 10A and 10B are timing diagrams illustrating one example of the operation of the circuit of FIG. 9B.
Figure 10B:
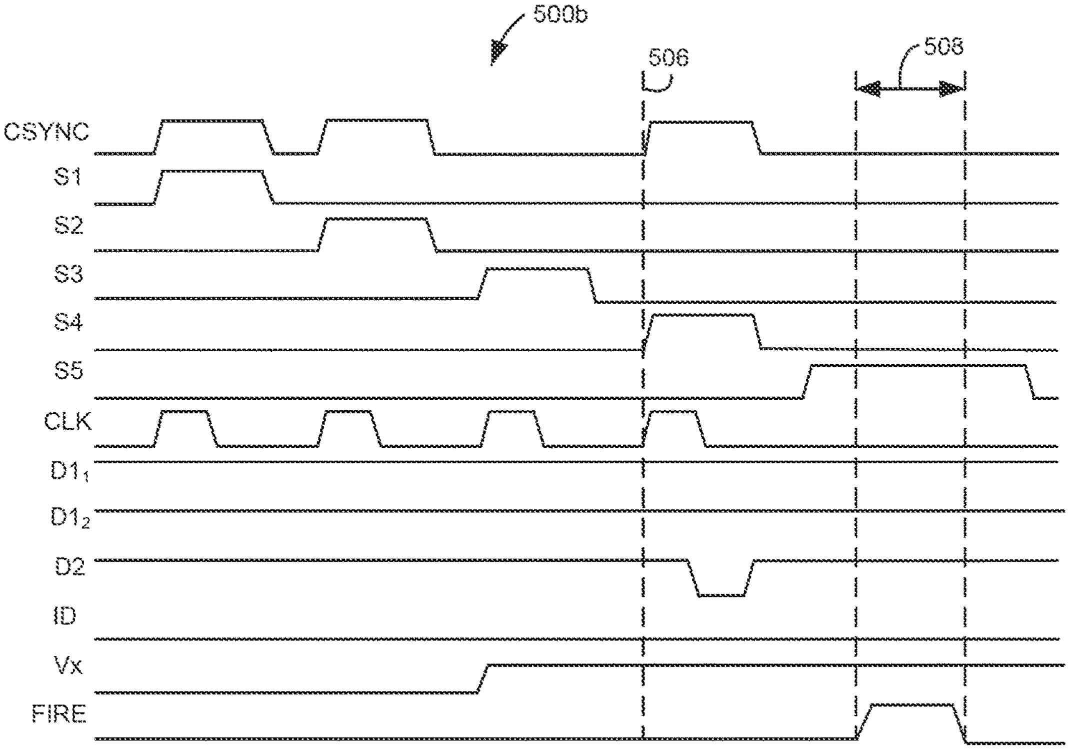

FIGS. 10A and 10B are timing diagrams illustrating one example of the operation of the circuit 450 of FIG. 9B. FIG. 10A illustrates a timing diagram 500*a* for when a memory element 214 is enabled, and FIG. 10B illustrates a timing diagram 500*b* for when a fluid actuation device 352 is enabled. Timing diagrams 500*a* and 500*b* include the CSYNC signal, an S1 select signal, an S2 select signal, an S3 select signal on S3 select line 234, an S4 select signal on S4 select line 236, an S5 select signal on S5 select line 238, a clock signal, a $D1_1$ data signal on $D1_1$ data line $\mathbf{216_1}$, a $D1_2$ data signal on $D1_2$ data line $\mathbf{216_2}$, a D2 data signal on D2 data line 218, an ID signal on ID line 142, a Vx signal on Vx node 411, and a fire signal on fire line 140.

The S1 through S5 select signals are sequentially activated. The S1 and S2 select signals may be used by first memory 112, such as to control shift register decoder 134. As shown in FIG. 10A at 502, when the ID signal is logic high when the S4 signal is logic high, Vx is logic low. Thus, when the S5 signal is logic high, the discharge path for memory element 214 is off and the memory element 214 is enabled for read and/or write access via the fire signal as indicated at 504. As shown in FIG. 10B at 506, when the ID signal is logic low when the S4 signal is logic high, Vx is logic high. Thus, when the S5 signal is logic high, the discharge path for memory element 214 is on and memory element 214 is disabled. With memory element 214 disabled, the fluid actuation device 352 may be enabled and may be activated via the fire signal as indicated at 508.

In one example, as shown in FIGS. 10A and 10B, the ID signal and the fire signal may not be turned on (i.e., logic high) at the same time. Accordingly, the ID signal is latched to provide Vx when the S4 signal is logic high to prepare for the fire signal when S5 is logic high. This also ensures that either the gate of transistor 328 for memory element 214 or the gate of transistor 358 for fluid actuation device 352 has a discharge path to avoid a floating condition when unselected. A floating condition should be avoided to prevent corruption of the data stored in second memory 114.

Figure 11A:
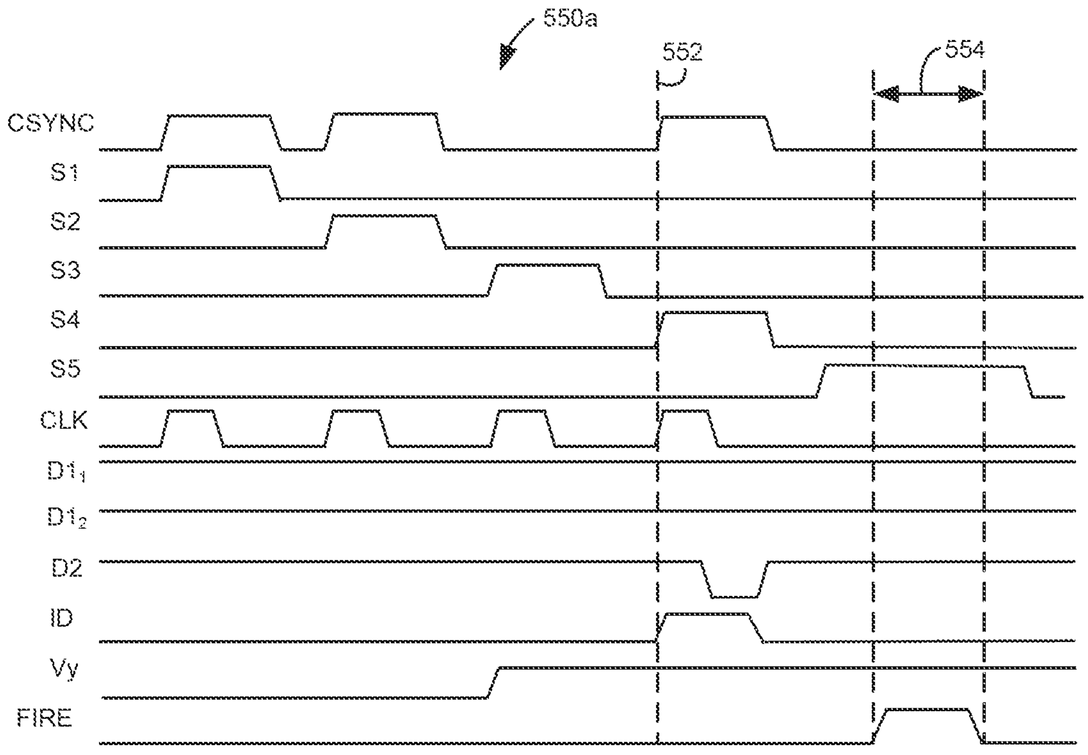
FIGS. 11A and 11B are timing diagrams illustrating another example of the operation of the circuit of FIG. 9B.
Figure 11B:
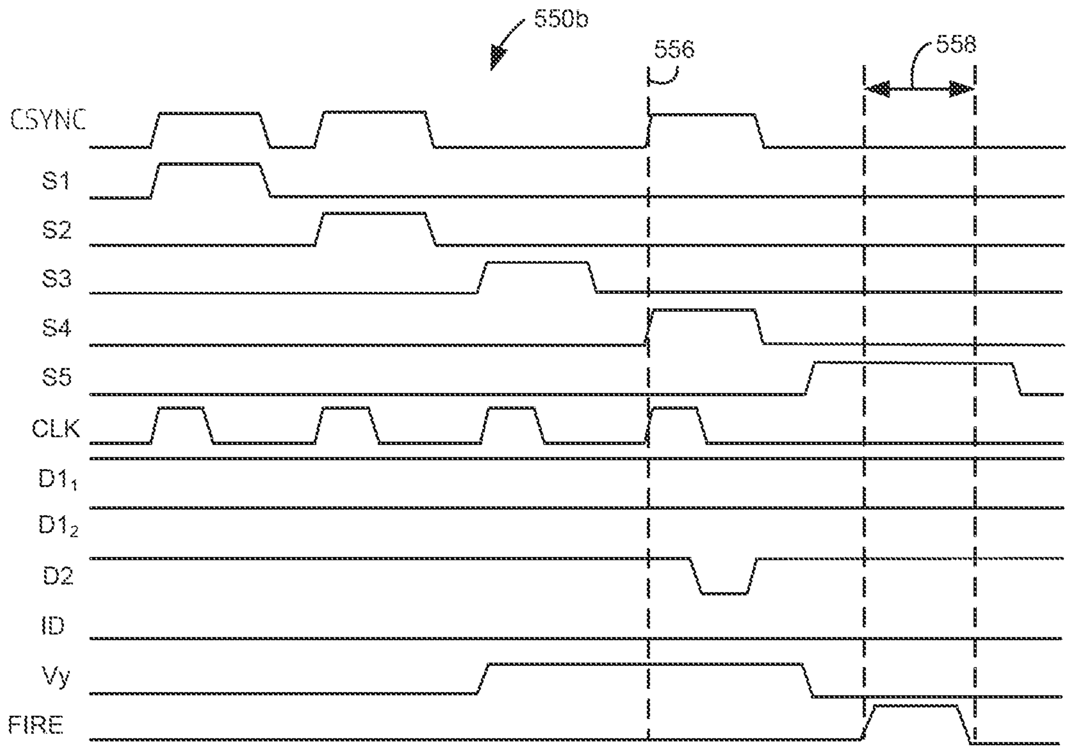

FIGS. 11A and 11B are timing diagrams illustrating another example of the operation of the circuit of FIG. 9B. FIG. 11A illustrates a timing diagram 550*a* for when a memory element 214 is enabled, and FIG. 11B illustrates a timing diagram 550*b* for when a fluid actuation device 352 is enabled. Timing diagrams 550*a* and 550*b* include the CSYNC signal, an S1 select signal, an S2 select signal, an S3 select signal on S3 select line 234, an S4 select signal on S4 select line 236, an S5 select signal on S5 select line 238, a clock signal, a $D1_1$ data signal on $D1_1$ data line 216$_1$, a $D1_2$ data signal on $D1_2$ data line 216$_2$, a D2 data signal on D2 data line 218, an ID signal on ID line 142, a Vy signal on Vy node 409, and a fire signal on fire line 140.

As shown in FIG. 11A at 552, when the ID signal is logic high when the S4 signal is logic high, Vy is logic high when the S5 signal is logic high. With Vy logic high, the memory element 214 is enabled for read and/or write access via the fire signal as indicated at 554. As shown in FIG. 11B at 556, when the ID signal is logic low when the S4 signal is logic high, Vy is logic low when the S5 signal is logic high. With Vy logic low, the memory element 214 is disabled and isolated from the fire signal. With memory element 214 disabled, the fluid actuation device 352 may be enabled and may be activated via the fire signal as indicated at 558.

In one example, as shown in FIGS. 11A and 11B, the ID signal and the fire signal may not be turned on (i.e., logic high) at the same time. Accordingly, the ID signal is latched to provide Vy when the S4 signal is logic high to prepare for the fire signal when S5 is logic high. Transistor 324 also serves as an isolator between the fire signal and memory element 214 when a fluid actuation device 352 is activated. This may prevent memory element 214 from being subjected to high voltage at high frequency, which may improve the reliability of memory element 214.

Figure 12:
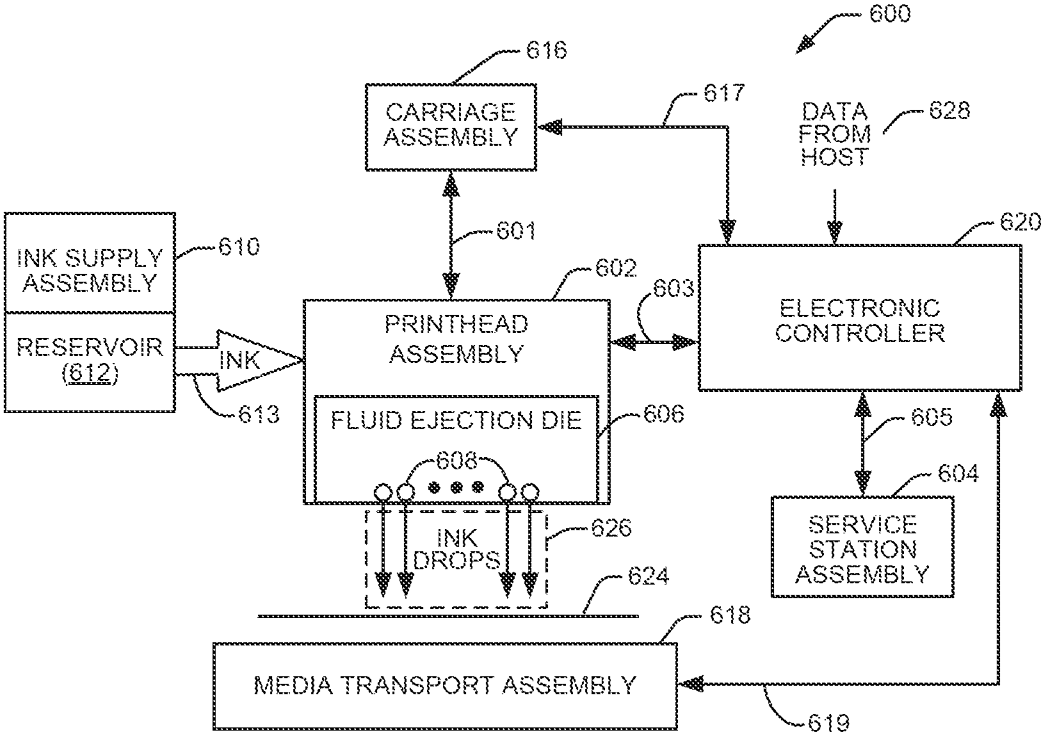
FIG. 12 is a block diagram illustrating one example of a fluid ejection system.

FIG. 12 is a block diagram illustrating one example of a fluid ejection system 600. Fluid ejection system 600 includes a fluid ejection assembly, such as printhead assembly 602, and a fluid supply assembly, such as ink supply assembly 610. In the illustrated example, fluid ejection system 600 also includes a service station assembly 604, a carriage assembly 616, a print media transport assembly 618, and an electronic controller 620. While the following description provides examples of systems and assemblies for fluid handling with regard to ink, the disclosed systems and assemblies are also applicable to the handling of fluids other than ink.

Printhead assembly 602 includes at least one printhead or fluid ejection die 606, such as fluid ejection device 106 of FIG. 1, which ejects drops of ink or fluid through a plurality of orifices or nozzles 608. In one example, the drops are directed toward a medium, such as print media 624, so as to print onto print media 624. In one example, print media 624 includes any type of suitable sheet material, such as paper, card stock, transparencies, Mylar, fabric, and the like. In another example, print media 624 includes media for three-dimensional (3D) printing, such as a powder bed, or media for bioprinting and/or drug discovery testing, such as a reservoir or container. In one example, nozzles 608 are arranged in at least one column or array such that properly sequenced ejection of ink from nozzles 608 causes characters, symbols, and/or other graphics or images to be printed upon print media 624 as printhead assembly 602 and print media 624 are moved relative to each other.

Ink supply assembly 610 supplies ink to printhead assembly 602 and includes a reservoir 612 for storing ink. As such, in one example, ink flows from reservoir 612 to printhead assembly 602. In one example, printhead assembly 602 and ink supply assembly 610 are housed together in an inkjet or fluid-jet print cartridge or pen. In another example, ink supply assembly 610 is separate from printhead assembly 602 and supplies ink to printhead assembly 602 through an interface connection 613, such as a supply tube and/or valve.

Carriage assembly 616 positions printhead assembly 602 relative to print media transport assembly 618, and print media transport assembly 618 positions print media 624 relative to printhead assembly 602. Thus, a print zone 626 is defined adjacent to nozzles 608 in an area between printhead assembly 602 and print media 624. In one example, printhead assembly 602 is a scanning type printhead assembly such that carriage assembly 616 moves printhead assembly 602 relative to print media transport assembly 618. In another example, printhead assembly 602 is a non-scanning type printhead assembly such that carriage assembly 616 fixes printhead assembly 602 at a prescribed position relative to print media transport assembly 618.

Service station assembly 604 provides for spitting, wiping, capping, and/or priming of printhead assembly 602 to maintain the functionality of printhead assembly 602 and, more specifically, nozzles 608. For example, service station assembly 604 may include a rubber blade or wiper which is periodically passed over printhead assembly 602 to wipe and clean nozzles 608 of excess ink. In addition, service station assembly 604 may include a cap that covers printhead assembly 602 to protect nozzles 608 from drying out during periods of non-use. In addition, service station assembly 604 may include a spittoon into which printhead assembly 602 ejects ink during spits to ensure that reservoir 612 maintains an appropriate level of pressure and fluidity, and to ensure that nozzles 608 do not clog or weep. Functions of service station assembly 604 may include relative motion between service station assembly 604 and printhead assembly 602.

Electronic controller 620 communicates with printhead assembly 602 through a communication path 603, service station assembly 604 through a communication path 605, carriage assembly 616 through a communication path 617, and print media transport assembly 618 through a communication path 619. In one example, when printhead assembly 602 is mounted in carriage assembly 616, electronic controller 620 and printhead assembly 602 may communicate via carriage assembly 616 through a communication path 601. Electronic controller 620 may also communicate with ink supply assembly 610 such that, in one implementation, a new (or used) ink supply may be detected.

Electronic controller 620 receives data 628 from a host system, such as a computer, and may include memory for temporarily storing data 628. Data 628 may be sent to fluid ejection system 600 along an electronic, infrared, optical or other information transfer path. Data 628 represent, for example, a document and/or file to be printed. As such, data 628 form a print job for fluid ejection system 600 and includes at least one print job command and/or command parameter.

In one example, electronic controller 620 provides control of printhead assembly 602 including timing control for ejection of ink drops from nozzles 608. As such, electronic controller 620 defines a pattern of ejected ink drops which form characters, symbols, and/or other graphics or images on print media 624. Timing control and, therefore, the pattern of ejected ink drops, is determined by the print job commands and/or command parameters. In one example, logic and drive circuitry forming a portion of electronic controller 620 is located on printhead assembly 602. In another example, logic and drive circuitry forming a portion of electronic controller 620 is located off printhead assembly 602.

Figure 13A:
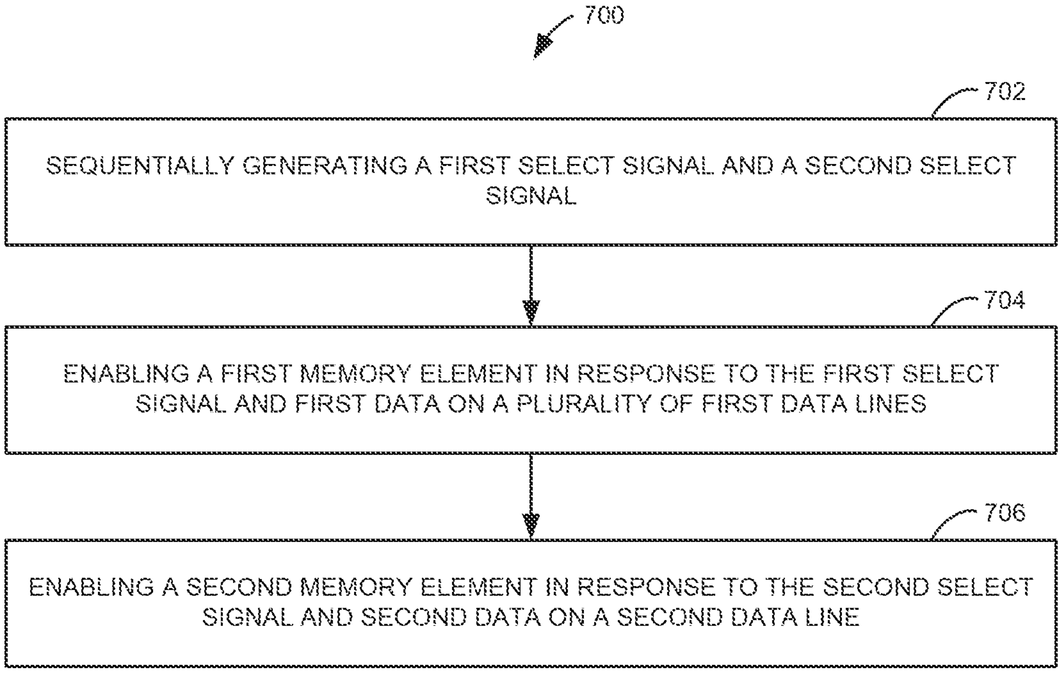
FIGS. 13A-13D are flow diagrams illustrating one example of a method for accessing a first memory and a second memory of a fluid ejection device.

FIGS. 13A-13D are flow diagrams illustrating one example of a method 700 for accessing a first memory and a second memory of a fluid ejection device. In one example, method 700 may be implemented by fluid ejection system 100 of FIG. 1. As illustrated in FIG. 13A, at 702 method 700 includes sequentially generating a first select signal and a second select signal. At 704, method 700 includes enabling a first memory element in response to the first select signal and first data on a plurality of first data lines. At 706, method 700 includes enabling a second memory element in response to the second select signal and second data on a second data line.

Figure 13B:
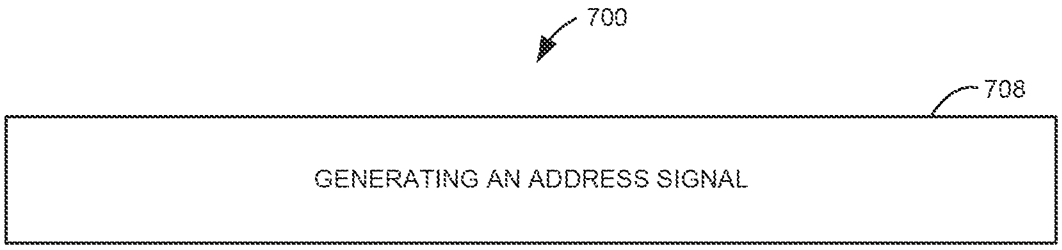

As illustrated in FIG. 13B, at 708 method 700 may further include generating an address signal. In this case, enabling the second memory element may include enabling the second memory element in response to the second select signal, the second data on the second data line, and the address signal.

Figure 13C:
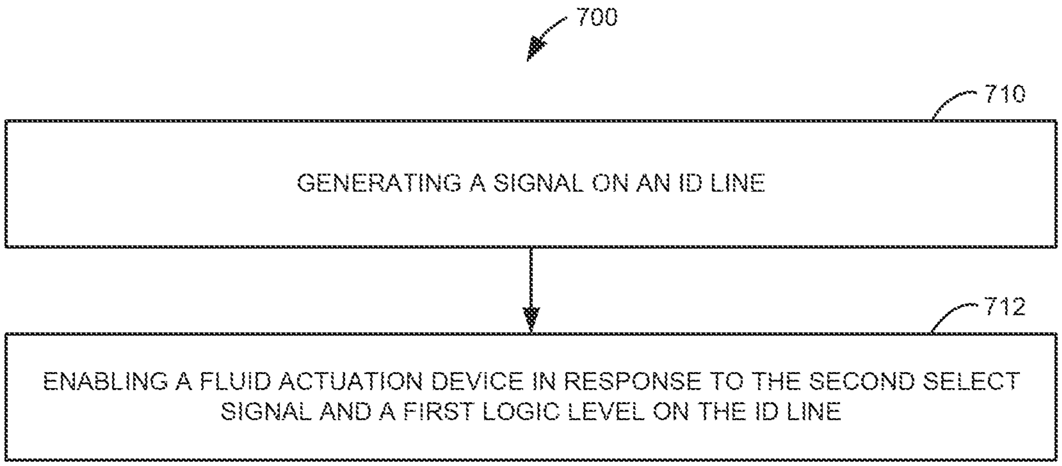

As illustrated in FIG. 13C, at 710 method 700 may further include generating a signal on an ID line. At 712, method 700 may further include enabling a fluid actuation device in response to the second select signal and a first logic level on the ID line. In this case, enabling the second memory element may include enabling the second memory element in response to the second select signal and a second logic level on the ID line.

Figure 13D:
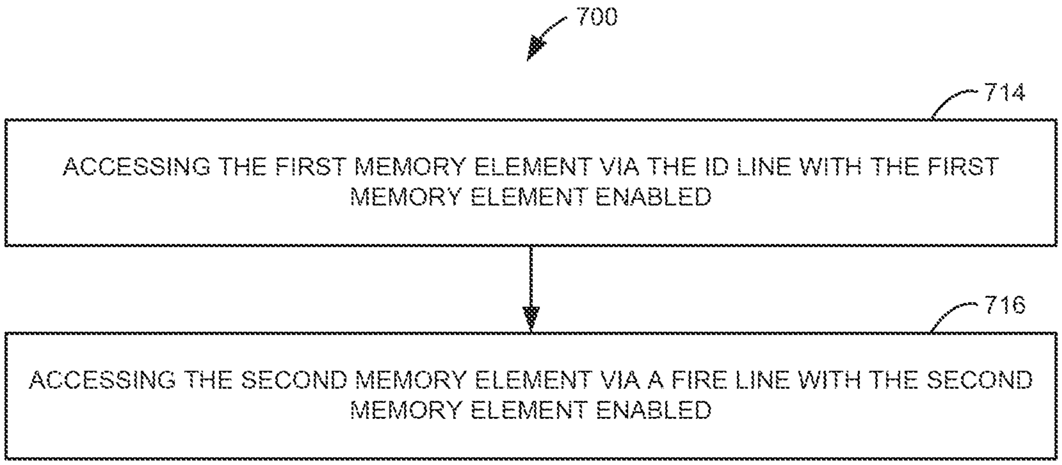

As illustrated in FIG. 13D, at 714 method 700 may further include accessing the first memory element via the ID line with the first memory element enabled. At 716, method 700 may further include accessing the second memory element via a fire line with the second memory element enabled.

Figure 14A:
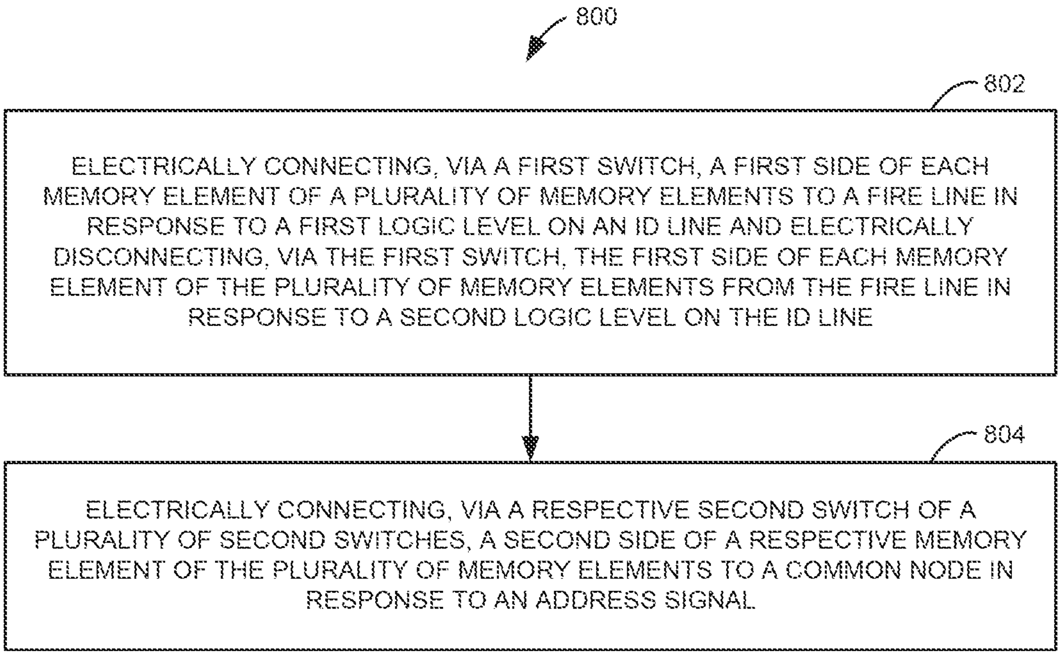
FIGS. 14A-14B are flow diagrams illustrating one example of a method for accessing a memory of a fluid ejection device.
Figure 14B:
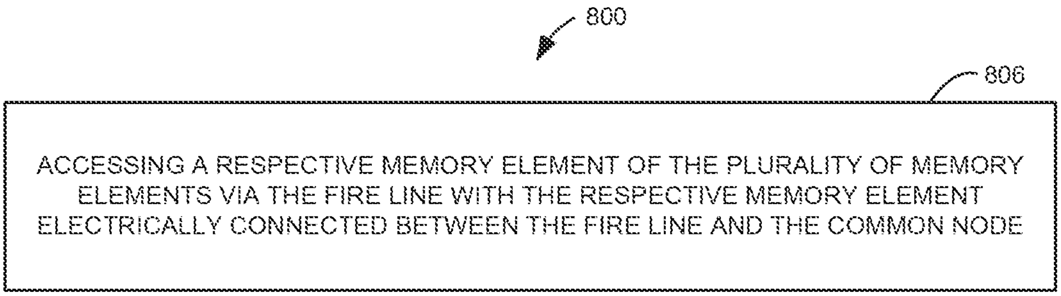

FIGS. 14A-14B are flow diagrams illustrating one example of a method 800 for accessing a memory of a fluid ejection device. In one example, method 800 may be implemented by fluid ejection system 100 of FIG. 1. As illustrated in FIG. 14A, at 802 method 800 includes electrically connecting, via a first switch, a first side of each memory element of a plurality of memory elements to a fire line in response to a first logic level on an ID line and electrically disconnecting, via the first switch, the first side of each memory element of the plurality of memory elements from the fire line in response to a second logic level on the ID line. At 804, method 800 includes electrically connecting, via a respective second switch of a plurality of second switches, a second side of a respective memory element of the plurality of memory elements to a common node in response to an address signal.

In one example, the first switch includes a first transistor and the plurality of second switches include a plurality of second transistors. As illustrated in FIG. 14B, at 806 method 800 may further include accessing a respective memory element of the plurality of memory elements via the fire line with the respective memory element electrically connected between the fire line and the common node.

Figure 15A:
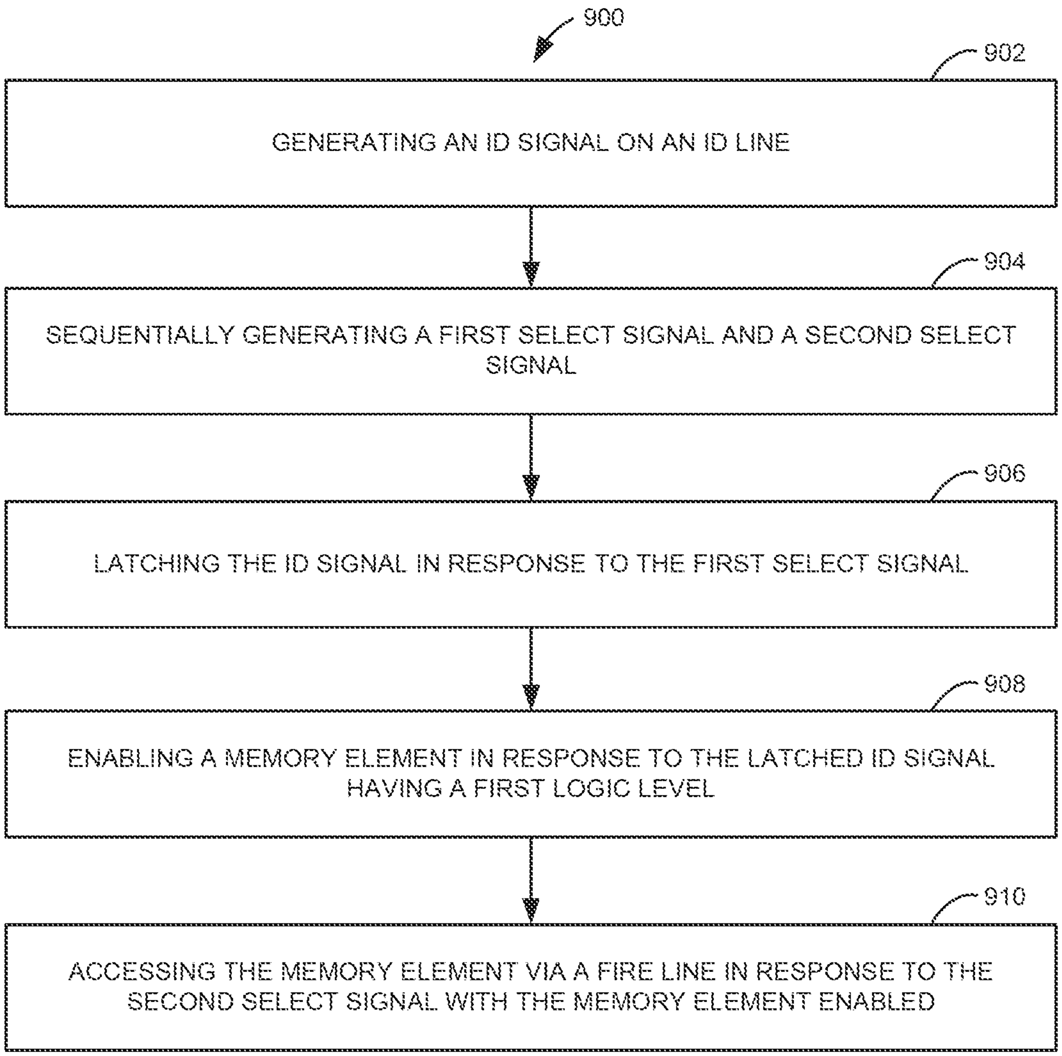
FIGS. 15A-15B are flow diagrams illustrating another example of a method for accessing a memory of a fluid ejection device.
Figure 15B:
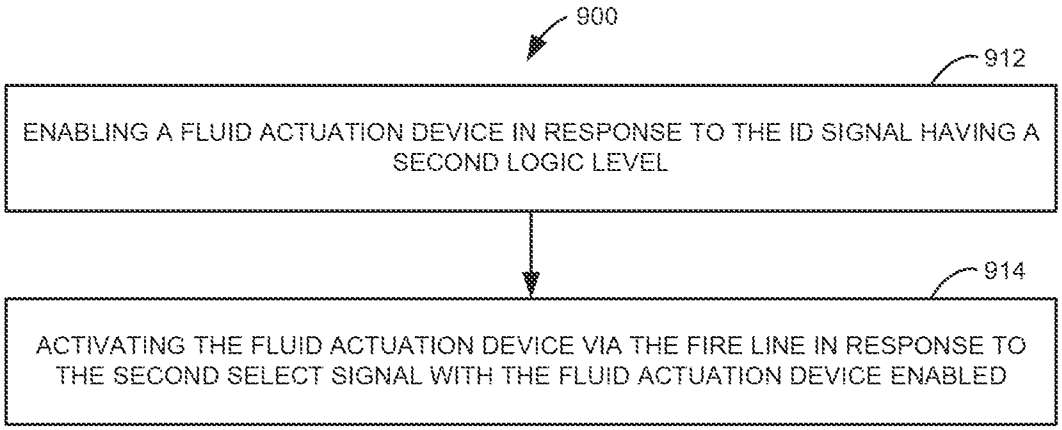

FIGS. 15A-15B are flow diagrams illustrating another example of a method 900 for accessing a memory of a fluid ejection device. In one example, method 900 may be implemented by fluid ejection system 100 of FIG. 1. As illustrated in FIG. 15A, at 902 method 900 includes generating an ID signal on an ID line. At 904, method 900 includes sequentially generating a first select signal and a second select signal. At 906, method 900 includes latching the ID signal in response to the first select signal. At 908, method 900 includes enabling a memory element in response to the latched ID signal having a first logic level. At 910, method 900 includes accessing the memory element via a fire line in response to the second select signal with the memory element enabled.

In one example, enabling the memory element includes electrically connecting the memory element to the fire line in response to the latched ID signal having the first logic level. In another example, latching the ID signal includes inverting the ID signal and latching the inverted ID signal in response to the first select signal; and enabling the memory element includes turning off a discharge path coupled to the memory element in response to the latched inverted ID signal having a second logic level.

As illustrated in FIG. 15B, at 912 method 900 may further include enabling a fluid actuation device in response to the ID signal having a second logic level. At 914, method 900 may further include activating the fluid actuation device via the fire line in response to the second select signal with the fluid actuation device enabled.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed:

1. A print cartridge comprising a printhead die, the die comprising:

- an ID line;
- an array of fluid actuation devices;
- a switch coupled with at least one of the fluid actuation devices;
- a first latch coupled between the ID line and the switch to enable the switch in response to a first logic level on the ID line and disable the switch in response to a second logic level on the ID line;
- a second latch having an input coupled with the ID line and an output coupled with a plurality of transistors; and
- a fire line coupled with one or more of the fluid activation devices and the switch, the switch coupled between the fire line and a memory element, and the fire line to control activation of the at least one of the fluid activation devices in response to the first logic level on the ID line to enable the switch,
- wherein the memory element is accessed through the fire line, responsive to the plurality of transistors receiving an address input when the ID line is at the first logic level.

2. The print cartridge of claim 1, the circuit further comprising:

the switch electrically coupled with the at least one of the fluid actuation devices and the memory element.

3. The print cartridge of claim 2, the fire line to communicate data of the memory element, in response to the second logic level on the ID line.

4. The print cartridge of claim 1, the circuit further comprising:

the fire line to activate a fluid actuation device, in response a selection of the fluid actuation device from among the plurality of fluid actuation devices.

5. The print cartridge of claim 1, the first latch to disable the fire line in response to the second logic level on the ID line to disable the switch.

6. An inkjet cartridge comprising a printhead having a plurality of fluid actuation devices, the printhead comprising:

an ID line;

a fluid actuation device of the plurality of fluid actuation devices;

a switch coupled with the fluid actuation device;

a first latch coupled between the ID line and the switch to enable the switch in response to a first logic level on the ID line and disable the switch in response to a second logic level on the ID line;

a second latch having an input coupled with the ID line and an output coupled with a plurality of transistors; and a fire line coupled with one or more of the fluid activation devices and the switch, the switch coupled between the fire line and a memory element, and the fire line to control activation of the fluid activation device in response to the first logic level on the ID line to enable the switch, wherein the memory element is accessed through the fire line, responsive to the plurality of transistors receiving an address input when the ID line is at the first logic level.

7. The inkjet cartridge of claim 6, the circuit further comprising:

the switch electrically coupled with the fluid actuation device and the memory element.

8. The inkjet cartridge of claim 7, the fire line to communicate data of the memory element, in response to the second logic level on the ID line.

9. The inkjet cartridge of claim 6, the circuit further comprising:

the fire line to activate the fluid actuation device, in response a selection of the fluid actuation device from among the plurality of fluid actuation devices.

10. The inkjet cartridge of claim 6, the first latch to disable the fire line in response to the second logic level on the ID line to disable the switch.

11. An inkjet cartridge comprising a printhead including an integrated circuit comprising a plurality of fluid actuation devices, the integrated circuit comprising:

an ID line;

a switch coupled with a fluid actuation device of the plurality of fluid actuation devices;

a first latch coupled between the ID line and the switch to enable the switch in response to a first logic level on the ID line and disable the switch in response to a second logic level on the ID line;

a second latch having an input coupled with the ID line and an output coupled with a plurality of transistors; and a fire line coupled with one or more of the fluid activation devices and the switch, the switch coupled between the fire line and a memory element, and the switch, the fire line to control activation of the fluid activation device in response to the first logic level on the ID line to enable the switch, wherein the memory element is accessed through the fire line, responsive to the plurality of transistors receiving an address input when the ID line is at the first logic level.

12. The inkjet cartridge of claim 11, the integrated circuit further comprising:

the switch electrically coupled with the fluid actuation device and the memory element.

13. The inkjet cartridge of claim 12, the fire line to communicate data of the memory element.

14. The inkjet cartridge of claim 12, the fire line to communicate data of the memory element, in response to the second logic level on the ID line.

15. The inkjet cartridge of claim 11, the fire line to activate the fluid actuation device, in response a selection of the fluid actuation device from among the plurality of fluid actuation devices.

16. The inkjet cartridge of claim 11, the first latch to disable the fire line in response to the second logic level on the ID line to disable the switch.

* * * * *